United States Patent
Mochimaru et al.

(10) Patent No.: US 10,633,008 B2
(45) Date of Patent: Apr. 28, 2020

(54) DC-FEEDING-VOLTAGE CALCULATING APPARATUS, DC-FEEDING-VOLTAGE CONTROL SYSTEM, AND DC-FEEDING-VOLTAGE CALCULATING METHOD

(71) Applicant: MITSUBISHI ELECTRIC CORPORATION, Chiyoda-ku, Tokyo (JP)

(72) Inventors: Hironori Mochimaru, Tokyo (JP); Keiki Fujita, Tokyo (JP); Kenji Ueda, Tokyo (JP); Toshihiro Wada, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/070,402

(22) PCT Filed: Mar. 15, 2016

(86) PCT No.: PCT/JP2016/058170
§ 371 (c)(1),
(2) Date: Jul. 16, 2018

(87) PCT Pub. No.: WO2017/158728
PCT Pub. Date: Sep. 21, 2017

(65) Prior Publication Data
US 2019/0016356 A1 Jan. 17, 2019

(51) Int. Cl.
*B61L 3/00* (2006.01)
*B61L 25/02* (2006.01)
(Continued)

(52) U.S. Cl.
CPC .............. *B61L 3/006* (2013.01); *B60L 5/20* (2013.01); *B60L 5/24* (2013.01); *B60L 7/10* (2013.01);
(Continued)

(58) Field of Classification Search
None
See application file for complete search history.

(56) References Cited

FOREIGN PATENT DOCUMENTS

| JP | 7-304353 A | 11/1995 |
|----|------------|---------|
| JP | 2013-059144 A | 3/2013 |
| JP | 2015-168348 A | 9/2015 |

OTHER PUBLICATIONS

International Search Report (PCT/ISA/210) dated May 31, 2016, by the Japanese Patent Office as the International Searching Authority for International Application No. PCT/JP2016/058170.
(Continued)

*Primary Examiner* — Abdhesh K Jha
(74) *Attorney, Agent, or Firm* — Buchanan Ingersoll & Rooney PC

(57) ABSTRACT

A DC-feeding-voltage calculating apparatus includes storage that stores train model information including information for controlling a regenerative power reducing amount in a train in an electrified section; feeding network model information including position information on a substation; and substation model information including control information on a substation voltage. On the basis of: the stored information; a voltage value, current values of feeders by train direction, the voltage and current values being measured in the substation; and first train information on a train including a wireless communication apparatus, an estimator estimates second train information on a train not including a wireless communication apparatus and outputs train operation information. A calculator, on the basis of the stored
(Continued)

information and the train operation information, calculates a substation voltage setting value for controlling the substation voltage such that regenerative power is increased in a regenerative car in the electrified section.

13 Claims, 15 Drawing Sheets

(51) Int. Cl.

| | | |
|---|---|---|
| *B60L 7/18* | (2006.01) | |
| *B60L 5/24* | (2006.01) | |
| *B60L 5/20* | (2006.01) | |
| *B60L 7/10* | (2006.01) | |
| *B60M 3/02* | (2006.01) | |
| *B60M 3/06* | (2006.01) | |
| *H02J 1/10* | (2006.01) | |
| *H02J 1/06* | (2006.01) | |
| *H02J 13/00* | (2006.01) | |
| *B61L 27/00* | (2006.01) | |
| *B60L 9/00* | (2019.01) | |
| *B60M 1/02* | (2006.01) | |

(52) U.S. Cl.
CPC ............... *B60L 7/18* (2013.01); *B60L 9/00* (2013.01); *B60M 1/02* (2013.01); *B60M 3/02* (2013.01); *B60M 3/06* (2013.01); *B61L 25/025* (2013.01); *B61L 27/0077* (2013.01); *H02J 1/06* (2013.01); *H02J 1/10* (2013.01); *H02J 13/0003* (2013.01); *B60L 2200/26* (2013.01); *B60L 2240/70* (2013.01); *B60L 2260/44* (2013.01)

(56) References Cited

OTHER PUBLICATIONS

Written Opinion (PCT/ISA/237) dated May 31, 2016, by the Japanese Patent Office as the International Searching Authority for International Application No. PCT/JP2016/058170.

Indian Office Action dated Feb. 13, 2020 issued by the Indian Patent Office in corresponding Indian Patent Application No. 201847031698 (5 pages).

DC-FEEDING-VOLTAGE CALCULATING APPARATUS, DC-FEEDING-VOLTAGE CONTROL SYSTEM, AND DC-FEEDING-VOLTAGE CALCULATING METHOD

FIELD

The present invention relates to a DC-feeding-voltage calculating apparatus, a DC-feeding-voltage control system, and a DC-feeding-voltage calculating method for calculating a DC feeding voltage in a railroad substation.

BACKGROUND

In recent years, research and development into effectively utilizing regenerative power generated by regenerative brakes included in trains for the purpose of energy saving and the like have been actively conducted. To effectively utilize regenerative power in a DC electrified section, there is a technology for dividing a traveling section of a train into a plurality of subsections, measuring electric currents and voltages of the overhead lines in the subsections using a plurality of current sensors and a plurality of voltage sensors, determining the on-rail state of the train, and calculating the value of the transmission voltage for the rectifiers in each substation (Patent Literature 1).

CITATION LIST

Patent Literature

Patent Literature 1: Japanese Patent Application Laid-Open No. 2015-168348

SUMMARY

Technical Problem

To accurately calculate a transmission voltage value, it is necessary to accurately estimate the position of a train. To accurately estimate the position of the train, the traveling section of the train has to be divided into small sections. However, the number of sections increases when the traveling section of the train is divided into small sections and the numbers of current sensors and voltage sensors set in the sections increases; therefore, there is a problem in that costs increase.

The present invention has been devised in view of the above, and an object of the present invention is to obtain a DC-feeding-voltage calculating apparatus capable of effectively utilizing regenerative power while reducing costs.

Solution to Problem

To solve the problem and achieve the object, the present invention provides a DC-feeding-voltage calculating apparatus connected to a plurality of substations that supply electric power to a feeder in a DC electrified section of an electric railroad, the DC-feeding-voltage calculating apparatus calculating a substation voltage applied to the feeder. The DC-feeding-voltage calculating apparatus includes a model-information storing unit to store model information, the model information including train model information, feeding network model information, and substation model information, the train model information including information for controlling a regenerative power reducing amount in a train existing in the DC electrified section, the feeding network model information including position information on the substation, the substation model information including control information on the substation voltage. The DC-feeding-voltage calculating apparatus further includes a train-operation-information estimating unit to estimate second train information on the basis of the model information, first train information, a voltage value, and current values of feeders by train direction, the voltage value and the current values being measured in the substation, the first train information being information on a train equipped with a wireless communication apparatus, the second train information being information on a train existing in the DC electrified section and not equipped with a wireless communication apparatus, the train-operation-information estimating unit outputting train operation information including the first train information and the second train information. The DC-feeding-voltage calculating apparatus further includes a substation-voltage-setting-value calculating unit to calculate, on the basis of the model information and the train operation information, a substation voltage setting value for controlling the substation voltage such that regenerative power is increased in a regenerative car existing in the DC electrified section, the substation-voltage-setting-value calculating unit outputting the substation voltage setting value to the substations.

Advantageous Effects of Invention

The present invention produces an effect of effectively utilizing regenerative power while reducing costs.

DESCRIPTION OF EMBODIMENTS

DC-feeding-voltage calculating apparatuses, DC-feeding-voltage control systems, and DC-feeding-voltage calculating methods according to embodiments of the present invention are explained in detail below with reference to the drawings. Note that the present invention is not limited by the embodiments.

First Embodiment

Figure 1:
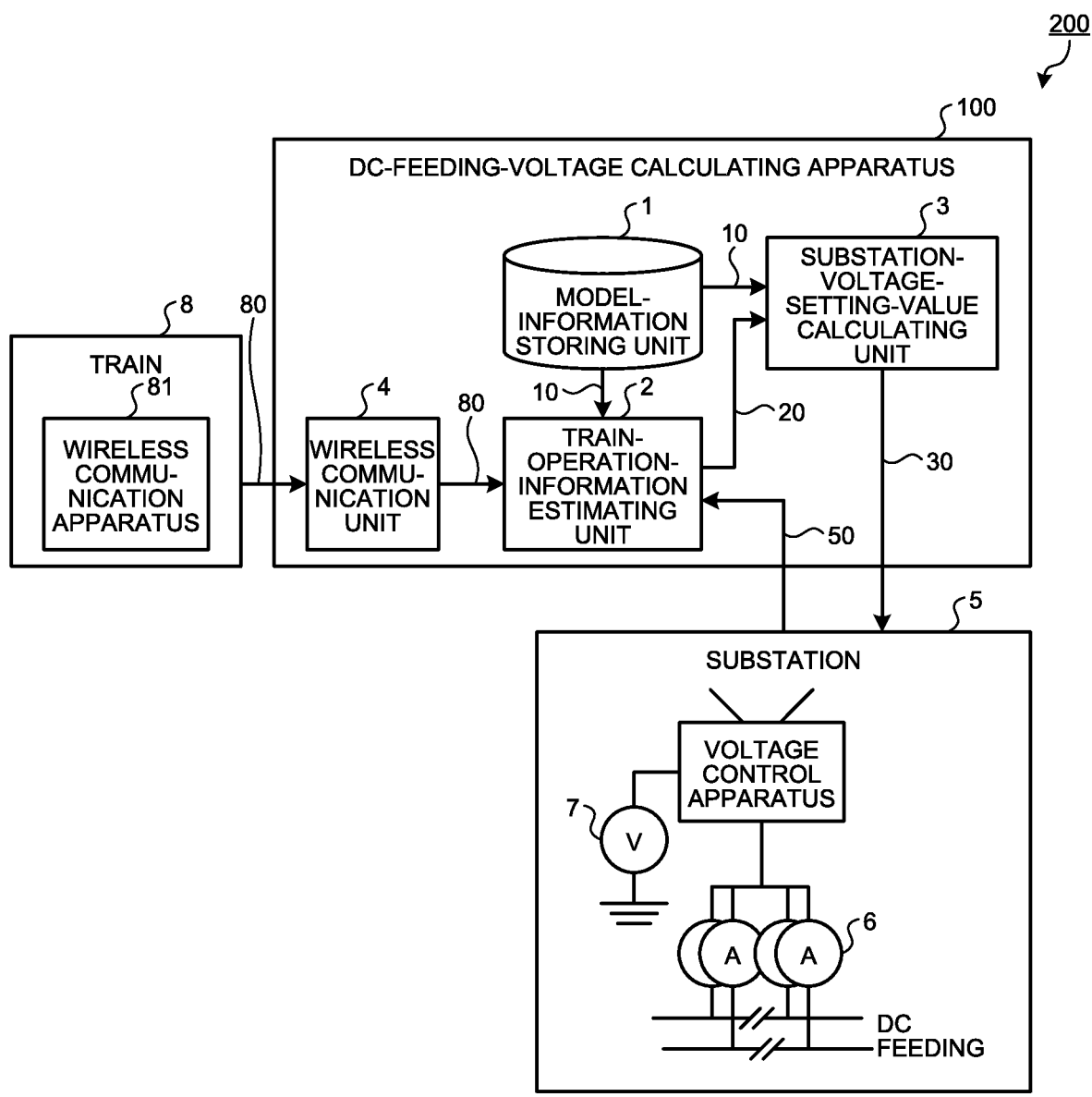
FIG. 1 is a block diagram illustrating an example configuration of a DC-feeding-voltage calculating apparatus according to a first embodiment.

FIG. 1 is a block diagram illustrating an example configuration of a DC-feeding-voltage calculating apparatus 100 according to a first embodiment of the present invention. The DC-feeding-voltage calculating apparatus 100 includes a model-information storing unit 1, a train-operation-information estimating unit 2, a substation-voltage-setting-value calculating unit 3, and a wireless communication unit 4.

Figure 2:
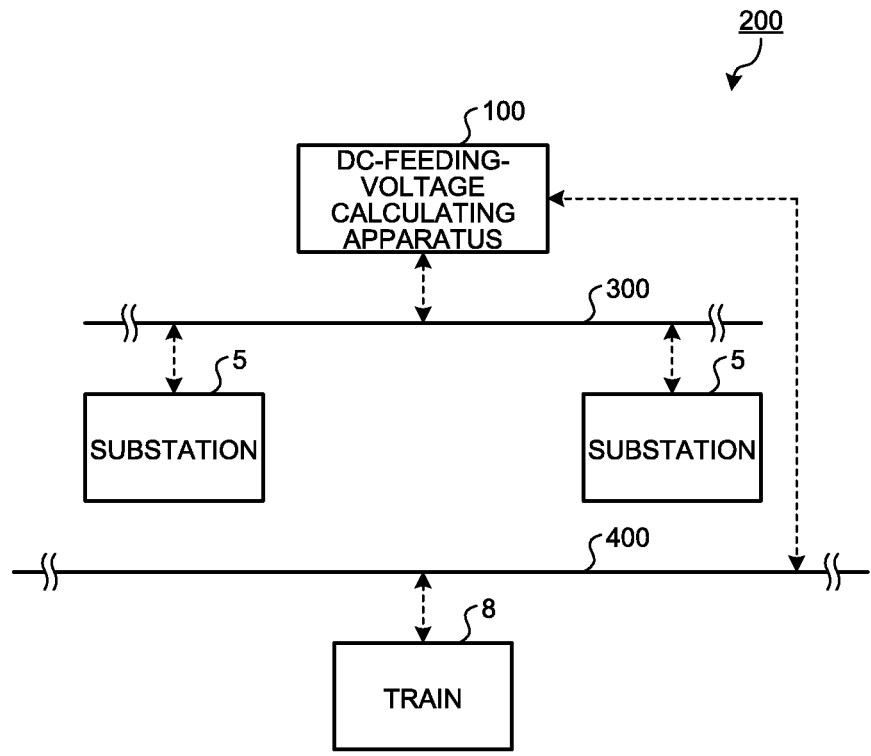
FIG. 2 is a diagram illustrating an example configuration of a DC-feeding-voltage control system according to the first embodiment.

FIG. 2 is a diagram illustrating an example configuration of a DC-feeding-voltage control system 200 according to the first embodiment. In the DC-feeding-voltage control system 200, the DC-feeding-voltage calculating apparatus 100 is disposed in, for example, a not-illustrated control center and connected to a substation 5 via a network 300 such as a Local Area Network (LAN). The DC-feeding-voltage calculating apparatus 100 is connected to a train 8 via a network 400 by wireless communication. The DC-feeding-voltage control system 200 is a system that controls the substation voltage applied to a feeder in a DC electrified section of an electric railroad.

A DC-feeding-voltage control concept in the DC-feeding-voltage calculating apparatus 100 is explained here. A train traveling in the DC electrified section performs power regeneration with a regenerative brake in applying a brake. In the following explanation, the train that is performing power regeneration is referred to as "regenerative car"; the maximum regenerative electric power which the regenerative brake can generate unless regenerative power reducing control is performed is referred to as "regeneratable power"; an electric current supplied from the regenerative car to an overhead line in the case of the regeneratable power is referred to as "regeneratable current"; and a regeneratable power that reflects a regenerative power reducing amount and is actually supplied to the overhead line is referred to as "regenerative power". The regenerative power generated in the regenerative car is supplied through the overhead line to a train that is performing power running. In the following explanation, the train that is performing the power running is referred to as "power running car" and the electric power necessary for the traveling of the power running car is referred to as "power-running power".

Figure 3:
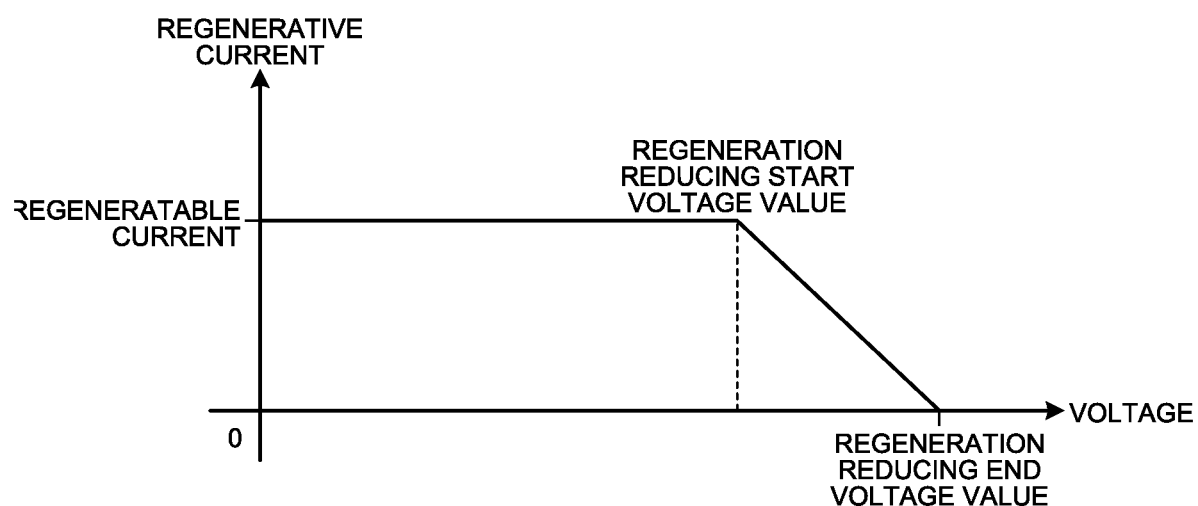
FIG. 3 is a diagram illustrating an example of regeneration reducing control in a regenerative car.

FIG. 3 is a diagram illustrating an example of regeneration reducing control in the regenerative car. The horizontal axis indicates a pantograph point voltage, which is a voltage at a point where a pantograph of the regenerative car is in contact with the overhead line. The vertical axis indicates the regenerative current supplied from the regenerative car to the overhead line. The regenerative power is the product of the pantograph point voltage and the regenerative current. When the regenerative car supplies the regenerative current, i.e., the regenerative power to the overhead line, the pantograph point voltage rises. At this time, when the number of power running cars is small with respect to a regenerative power amount, the regenerative power becomes excessive and the overhead line voltage also becomes excessive. To avoid this, the regenerative car supplies the entire regenerative current to the overhead line as a regeneratable current in a region where the pantograph point voltage is smaller than the regeneration reducing start voltage value illustrated in the figure and performs control for reducing the regenerative current in a region where the pantograph point voltage is equal to or larger than the regeneration reducing start voltage value. This control is referred to as regeneration reducing control. Note that, in general, in a 1500V-system DC electrified section, the regeneration reducing start voltage value is set to, for example, approximately 1650 volts to 1780 volts and the regeneration reducing end voltage value is set to, for example, approximately 1700 volts to 1800 volts. In a regenerative car existing in such a DC electrified section, the regeneration reducing control is performed to increase the regeneration reducing amount as the voltage increases between the regeneration reducing start voltage value and the regeneration reducing end voltage value.

When the regeneration reducing control is carried out, part of the regenerative power is wastefully consumed by the regenerative car due to regenerative cancellation. The wastefully consumed regenerative power is not effectively utilized as power-running power. To effectively utilize the regenerative power from the regenerative car, a substation voltage, which is a voltage at connection points of substations 5 and the overhead line, needs to be controlled such that the substation voltage is an optimum value. To determine the optimum substation voltage, it is necessary to accurately grasp the train state. In recent years, train control systems that wirelessly connect a train equipped with a wireless communication apparatus and a ground apparatus by utilizing a wireless communication network have spread. A system of this type can grasp a train state, using on-vehicle information wirelessly transmitted from the train. Unfortunately, when a train of a different railroad company not equipped with a wireless communication apparatus runs straight through into a route that employs such a train control system, it is difficult to grasp all the train states.

The DC-feeding-voltage calculating apparatus 100 according to this embodiment uses electric currents $i_{sn}$, voltages $v_{sn}$, substation positions $x_{sn}$, an electric current $i_{tn}$, a voltage $v_{tn}$, and an on-rail position $x_{tn}$. The electric currents $i_{sn}$ are values of electric currents measured by current sensors 6 of a plurality of substations 5. The current sensors 6 are set on feeders by direction in which a train travels. The voltages $v_{sn}$ are values of voltages measured by voltage sensors 7 set in the substations 5. Each of the substation positions $x_{sn}$ indicates a position of the substation 5. The electric current $i_{tn}$ is a value of an electric current supplied from the overhead line and measured in the train 8 equipped with a wireless communication apparatus 81, which train 8 is defined as a first train. The voltage $v_{tn}$ is a value of a pantograph point voltage measured in the train 8. The on-rail position $x_{tn}$ indicates the position of the train 8. In the DC-feeding-voltage calculating apparatus 100, the train-operation-information estimating unit 2 estimates states of all trains even when a regenerative car not equipped with a wireless communication apparatus exists in the DC electrified section. In the DC-feeding-voltage calculating apparatus 100, the substation-voltage-setting-value calculating unit 3 calculates a setting value of a substation voltage, using train operation information 20. The train operation information 20 is an estimation result made by the train-operation-information estimating unit 2. Since the setting value of the substation voltage is calculated in that manner, the substation voltage is controlled such that the substation voltage is an optimum value, thereby achieving effective utilization of regenerative power from the regenerative car.

The constituent units of the DC-feeding-voltage calculating apparatus 100 are explained here by referring back to FIG. 1. The model-information storing unit 1 stores train model information on each train traveling in the DC electrified section, substation model information on each substation 5, and feeding network model information. The train model information is information for controlling regenerative power reducing amounts in each train existing in the DC electrified section and includes, for example, a regeneration reducing start voltage value and a regeneration reducing end voltage value. The substation model information is information for controlling a substation voltage of each substation 5 and includes, for example, an internal resistance and the maximum substation voltage. The feeding network model information includes, for example, position information on each substation 5 and information indicating a connection state between overhead lines or between the overhead line and the substation 5. The information indicating such a connection state is information such as the length and the resistivity of the overhead line. Note that, in the following explanation, unless referred to in particular, the train model information, the substation model information, and the feeding network model information are simply abbreviated as "model information 10".

The substation 5 supplies electric power to a feeder in a DC electrified section of an electric railroad. The substation 5 includes the current sensors 6 and the voltage sensor 7. The substation 5 has the current sensors 6 and the voltage sensor 7. The current sensors 6 are set on, for example, overhead lines or feeders by train traveling direction. The voltage sensor 7 is set, for example, between a voltage control apparatus such as a Pulse Width Modulation (PWM) rectifier and the ground side. The substation 5 transmits "substation information 50" to the train-operation-information estimating unit 2. The substation information 50 includes information on the electric currents $i_{sn}$, which are values of electric currents measured by the current sensors 6, and information on the voltage $v_{sn}$, which is a value of a voltage measured by the voltage sensor 7. Note that, the current sensors 6 and the voltage sensor 7 of the substation may individually transmit the information on the electric currents $i_{sn}$ and the information on the voltage $v_{sn}$ instead of transmitting the information on the electric currents $i_{sn}$ and the voltage $v_{sn}$ together as the substation information 50.

The train 8 includes the wireless communication apparatus 81 that performs wireless communication with the DC-feeding-voltage calculating apparatus 100. The train 8 measures an on-rail position of the train 8; the voltage $v_{tn}$, which is a value of a pantograph point voltage in the position of the train 8; the electric current $i_{tn}$, which is a value of an electric current supplied from the overhead line to the train 8; power-running power; and regenerative power. The train 8 estimates a regeneratable voltage from the voltage $v_{tn}$ and the regenerative power. The train 8 transmits the "train information 80" to the train-operation-information estimating unit 2. The train information 80 is first train information including information on the on-rail position of, the voltage $v_{tn}$ of, the electric current $i_{tn}$ of, the power-running power of, the regenerative power of, and the regeneratable voltage of, the train 8.

The wireless communication unit 4 receives the train information 80 transmitted from the train 8 and outputs the received train information 80 to the train-operation-information estimating unit 2.

On the basis of: the model information 10 stored in the model-information storing unit 1; the substation information 50 acquired from the substation 5; and the train information 80 acquired from the train 8, the train-operation-information estimating unit 2 determines whether a second train, i.e., a train not equipped with a wireless communication apparatus exists between the substations 5, between the substation 5 and the train 8, or between the trains 8. When the train-operation-information estimating unit 2 estimates that the train not equipped with the wireless communication apparatus exists, the train-operation-information estimating unit 2 estimates second train information on the train not equipped with the wireless communication apparatus, i.e., an on-rail position of, power-running power of, regenerative power of, a pantograph point voltage of, and regeneratable power of, the train not equipped with the wireless communication apparatus. An example of a method for estimating the second train information in the train-operation-information estimating unit 2 is explained below. The train-operation-information estimating unit 2 transmits "train operation information 20" to the substation-voltage-setting-value calculating unit 3. The train operation information 20 is the train information 80 acquired from the train 8 and information on presence or absence of the second train. When the second train exists, the train-operation-information estimating unit 2 further includes, in the train operation information 20, the second train information estimated concerning the train not equipped with the wireless communication apparatus and transmits the train operation information including the second train information to the substation-voltage-setting-value calculating unit 3.

On the basis of the model information 10 stored in the model-information storing unit 1 and the train operation information 20 acquired from the train-operation-information estimating unit 2, the substation-voltage-setting-value calculating unit 3 calculates a substation voltage setting value 30 for controlling a substation voltage such that regenerative power is increased in the regenerative car existing in the DC electrified section. The substation-voltage-setting-value calculating unit 3 outputs the calculated substation voltage setting value 30 to the substation 5. Note that explanation is omitted concerning a method for calculating the substation voltage setting value 30 in the substation-voltage-setting-value calculating unit 3 because the substation voltage setting value 30 can be calculated by a known calculating method using the various kinds of information explained above. The present invention is not limited to any given calculating method for the substation voltage setting value 30.

The substation 5 receives the substation voltage setting value 30 and controls a value of the substation voltage such that the value of the substation voltage is the substation voltage setting value 30.

Figure 4:
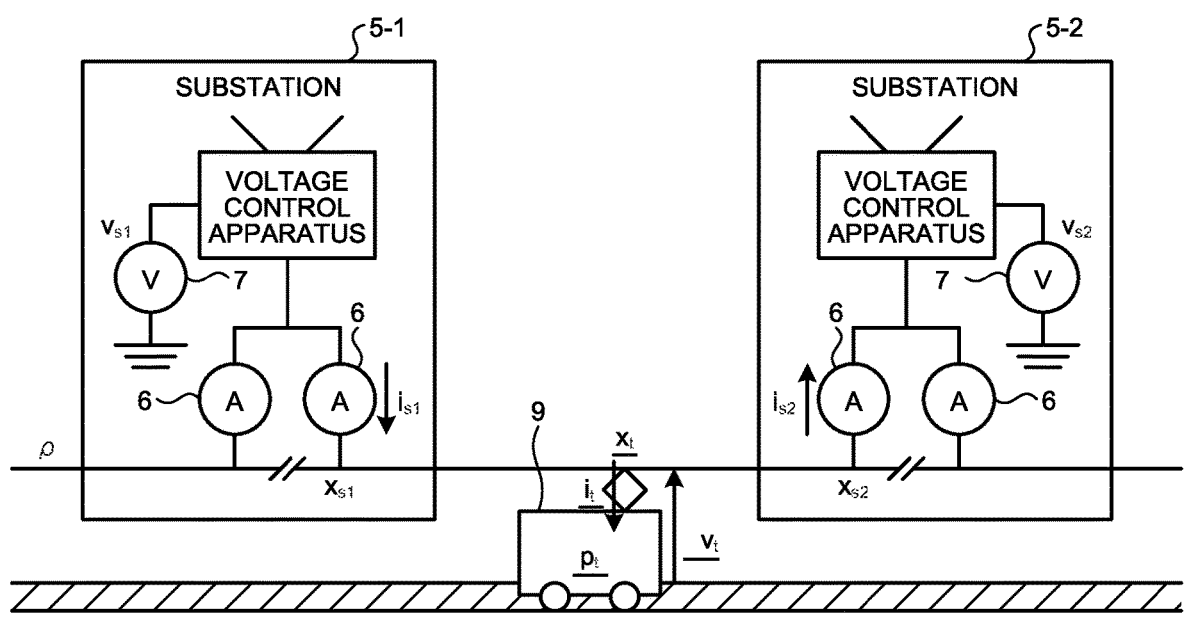
FIG. 4 is a diagram showing set variables used in estimation processing performed by a train-operation-information estimating unit according to the first embodiment for estimating second train information.

In the following explanation, an example of an estimating method for the second train information in the train-operation-information estimating unit 2 is explained with reference to FIG. 4 to FIG. 6. FIG. 4 is a diagram showing set variables used in estimation processing performed by the train-operation-information estimating unit 2 according to the first embodiment for estimating the second train information. In FIG. 4, reference sign "$x_{s1}$" indicates a position of a substation 5-1 illustrated on the left side of FIG. 4; reference sign "$i_{s1}$" indicates an electric current of the overhead line measured by the current sensor 6 of the substation 5-1; and reference sign "$v_{s1}$" indicates a voltage between the overhead line and a rail measured by the voltage sensor 7 of the substation 5-1. Further, reference sign "$x_{s2}$" indicates a position of a substation 5-2 illustrated on the right side of FIG. 4; reference sign "$i_{s2}$," indicates an electric current of the overhead line measured by the current sensor 6 of the substation 5-2; and reference sign "$v_{s2}$" indicates a voltage between the overhead line and the rail measured by the voltage sensor 7 of the substation 5-2. The substations 5-1 and 5-2 have the same configuration as the configuration of the substation 5 illustrated in FIG. 1. Furthermore, reference sign "$x_t$" indicates an on-rail position of a train 9 not equipped with a train wireless apparatus; reference sign "$i_t$" indicates an electric current supplied from the overhead line to the train 9; reference sign "$v_t$" indicates a pantograph point voltage in the position of the train 9; reference sign "$p_t$" indicates train power of the train 9; and reference sign "$\rho$" indicates resistivity with respect to the length of the overhead line. Note that a direction of flow of the electric current $i_t$ from the overhead line to the train 9 is taken as positive. When the train power $p_t$ is positive, the train power $p_t$ represents power-running power. When the train power $p_t$ is negative, the train power $p_t$ represents regenerative power.

Note that $x_t$, $i_t$, $v_t$, and $p_t$ are unknown variables, and $x_{s1}$, $x_{s2}$, and $\rho$ are stored in the model-information storing unit 1.

At this time, Expression (1) is obtained using Ohm's law between the substation 5-1 and the train 9.

[Expression 1]

$$v_{s1} - v_t = \rho(x_t - x_{s1})i_{s1} \qquad (1)$$

Expression (2) is obtained using Ohm's law between the substation 5-2 and the train 9.

[Expression 2]

$$v_t - v_{s2} = \rho(x_{s2} - x_t)i_{s2} \qquad (2)$$

Expression (3) is obtained using Kirchhoff's law in the train 9.

[Expression 3]

$$i_{s1} = i_{s2} + i_t \qquad (3)$$

Train power is represented by the product of a voltage and an electric current in Expression (4).

[Expression 4]

$$p_t = v_t i_t \qquad (4)$$

From the four expressions described above, $x_t$, $i_t$, $v_t$, and $p_t$ are represented by Expression (5) to Expression (8).

[Expression 5]

$$x_t = \frac{v_{s1} - v_{s2} + \rho x_{s1} i_{s1} - \rho x_{s2} i_{s2}}{\rho(i_{s1} - i_{s2})} \qquad (5)$$

[Expression 6]

$$i_t = i_{s1} - i_{s2} \qquad (6)$$

[Expression 7]

$$v_t = \frac{v_{s2} i_{s1} - v_{s1} i_{s2} + \rho x_{s2} i_{s1} i_{s2} - \rho x_{s1} i_{s1} i_{s2}}{i_{s1} - i_{s2}} \qquad (7)$$

[Expression 8]

$$p_t = v_{s2} i_{s1} - v_{s1} i_{s2} + \rho x_{s2} i_{s1} i_{s2} - \rho x_{s1} i_{s1} i_{s2} \qquad (8)$$

When power consumption of the train 9 existing between the substation 5-1 and the substation 5-2 is 0, $i_{s1}$ and $i_{s2}$ become equal to each other and it is unknown whether the train 9 exists between the substations, and thus an on-rail position of the train 9 cannot be successfully estimated. However, such failure to successfully estimate the on-rail position of the train 9 does not affect the calculation of a substation voltage because $i_{s1}$ and $i_{s2}$ being equal means that the power consumption of the train 9 is 0. Using the method explained above makes it possible to estimate an on-rail position of the train 9 and train power of the train 9, i.e., power-running power or regenerative power of the train 9.

A method for estimating regeneratable power is explained here. FIG. 5 is a diagram representing variables used by the train-operation-information estimating unit 2 according to the first embodiment in estimating regeneratable power of a train having high regeneration efficiency. The explanation is based on the assumption that information concerning whether a target train whose regeneratable power is estimated is a train having high regeneration efficiency or a train having low regeneration efficiency is included in the train model information of the model-information storing unit 1. In FIG. 5, reference sign "$v_t$" indicates a pantograph point voltage of the regenerative car estimated by Expression (7) described above; reference sign "$v_{start}$" indicates a regeneration reducing start voltage value of the regenerative car; reference sign "$v_{end}$" indicates a regeneration reducing end voltage value; reference sign "$i_t$" indicates a regenerative current of the regenerative car estimated by Expression (6) described above; and reference sign "$I_t$" indicates a regeneratable current of the regenerative car. Regeneratable power $P_t$ is represented by the product of the pantograph point voltage $v_t$ and the regeneratable current $I_t$ of Expression (9).

[Expression 9]

$$P_t = v_t I_t \quad (9)$$

Note that $I_t$ is an unknown variable and $v_{start}$ and $V_{end}$ are stored in the model-information storing unit 1.

Figure 5:
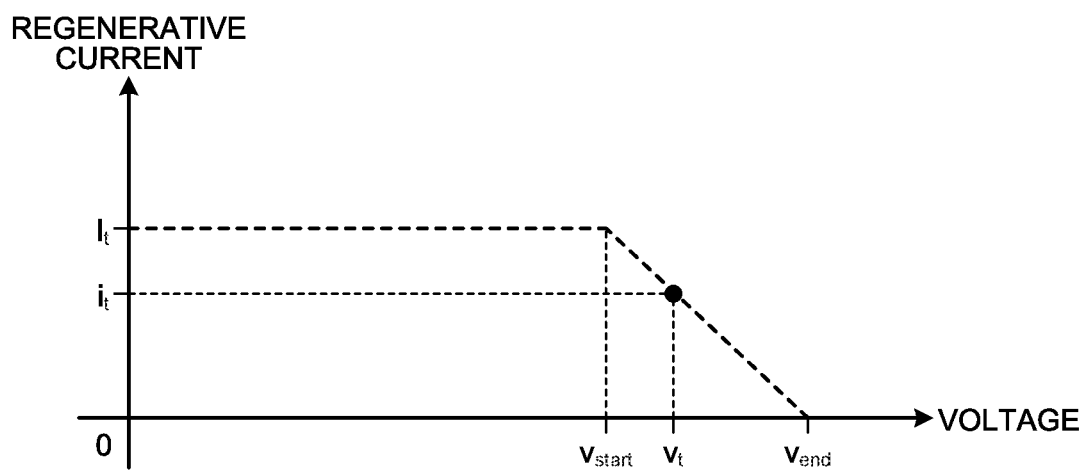
FIG. 5 is a diagram representing variables used by the train-operation-information estimating unit according to the first embodiment in estimating regeneratable power of a train having high regeneration efficiency.

One regeneration reducing control method of the regenerative car is a control method in which values of the regenerative current $i_t$ in the range of the regenerative current $i_t$ at the regeneration reducing start voltage value to the regeneration reducing end voltage value are connected to one another by a straight line as illustrated in FIG. 5.

FIG. 5 demonstrates that the regeneration reducing control is not performed when the pantograph point voltage $v_t$ is lower than $v_{start}$. Therefore, the regeneratable current $I_t$ can be represented by Expression (10).

[Expression 10]

$$I_t = i_t \quad (10)$$

When the pantograph point voltage $v_t$ is equal to or higher than $v_{start}$ and lower than $v_{end}$, the regenerative current $i_t$ corresponding to the pantograph point voltage $v_t$ is estimated as the regeneratable current $I_t$. When the pantograph point voltage $v_t$ is $v_{end}$, the regenerative current $i_t$ is estimated as 0. Using liner interpolation, the regeneratable current $I_t$ can be represented by Expression (11).

[Expression 11]

$$I_t = \frac{v_{end} - v_{start}}{v_{end} - v_t} i_t \quad (11)$$

Finally, if the pantograph point voltage $v_t$ is equal to or higher than $v_{end}$, the regenerative power $i_t$, which is reduced to the full, becomes zero ($i_t=0$) and thus the regeneratable current $I_t$ cannot be successfully estimated. However, a situation in which the regenerative current $i_t$ is reduced to the full, i.e., a situation in which the pantograph point voltage $v_t$ is equal to or higher than $v_{end}$, hardly ever occurs because the regeneration reducing end voltage value $v_{end}$ of the train is typically set relatively high. When the pantograph point voltage $v_t$ is equal to or higher than $v_{end}$ with the regenerative current $i_t$ reduced to the full, the regeneratable current $I_t$ is estimated as indicated by Expression (12) in order to allow the substation 5 to supply sufficient electric power to a power running train irrespective of the regeneratable current $I_t$.

[Expression 12]

$$I_t = 0 \quad (12)$$

The train-operation-information estimating unit 2 can estimate the regeneratable power $P_t$ by applying the regeneratable current $I_t$ obtained from Expression (10) to Expression (12) to the regeneratable current $I_t$ of Expression (9).

Figure 6:
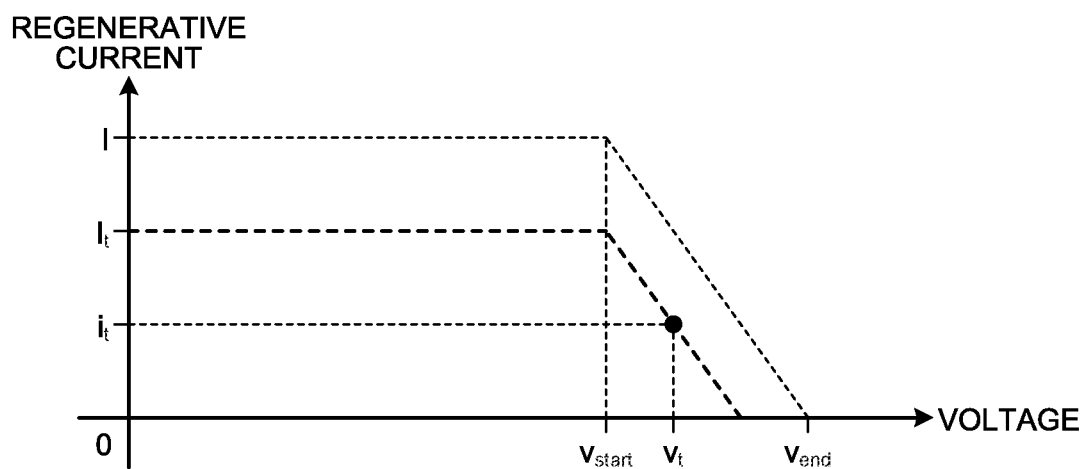
FIG. 6 is a diagram representing variables used by the train-operation-information estimating unit according to the first embodiment in estimating regeneratable power of a train having low regeneration efficiency.

FIG. 6 is a diagram representing variables used by the train-operation-information estimating unit 2 according to the first embodiment in estimating regeneratable power of a train having low regeneration efficiency. Note that reference sign "I" of FIG. 6, which indicates a maximum regeneratable current, is stored in the model-information storing unit 1.

When the pantograph point voltage $v_t$ is lower than $v_{start}$, $I_t$ can be represented by Expression (10) as in FIG. 5.

When the pantograph point voltage $v_t$ is equal to or higher than $v_{start}$ and lower than $v_{end}$, the regenerative current $i_t$ corresponding to the pantograph point current $v_t$ is estimated as the regeneratable current $I_t$. When the pantograph point voltage $v_t$ is $v_{end}$, the regenerative current $i_t$ is estimated as 0. Using linear interpolation, the regeneratable current $I_t$ can be represented by Expression (13).

[Expression 13]

$$I_t = i_t + \frac{v_t - v_{start}}{v_{end} - v_{start}} I \quad (13)$$

When the pantograph point voltage $v_t$ is equal to or higher than $v_{end}$, $I_t$ can be represented by Expression (12), as in FIG. 5.

The train-operation-information estimating unit 2 can estimate the regeneratable power $P_t$ by applying the regeneratable current $I_t$ obtained from Expression (10), Expression (12), and Expression (13) to the regeneratable current $I_t$ of Expression (9).

In this embodiment, one of the substations 5-1 and 5-2 illustrated in FIG. 4 can be replaced with the train 8 equipped with the wireless communication apparatus 81. That is, in a DC electrified section between the two substations 5-1 and 5-2, the DC-feeding-voltage calculating apparatus 100 can regard the train 8 equipped with the wireless communication apparatus 81 as a known train and estimate the on-rail state of an unknown train not equipped with a wireless communication apparatus.

Figure 7:
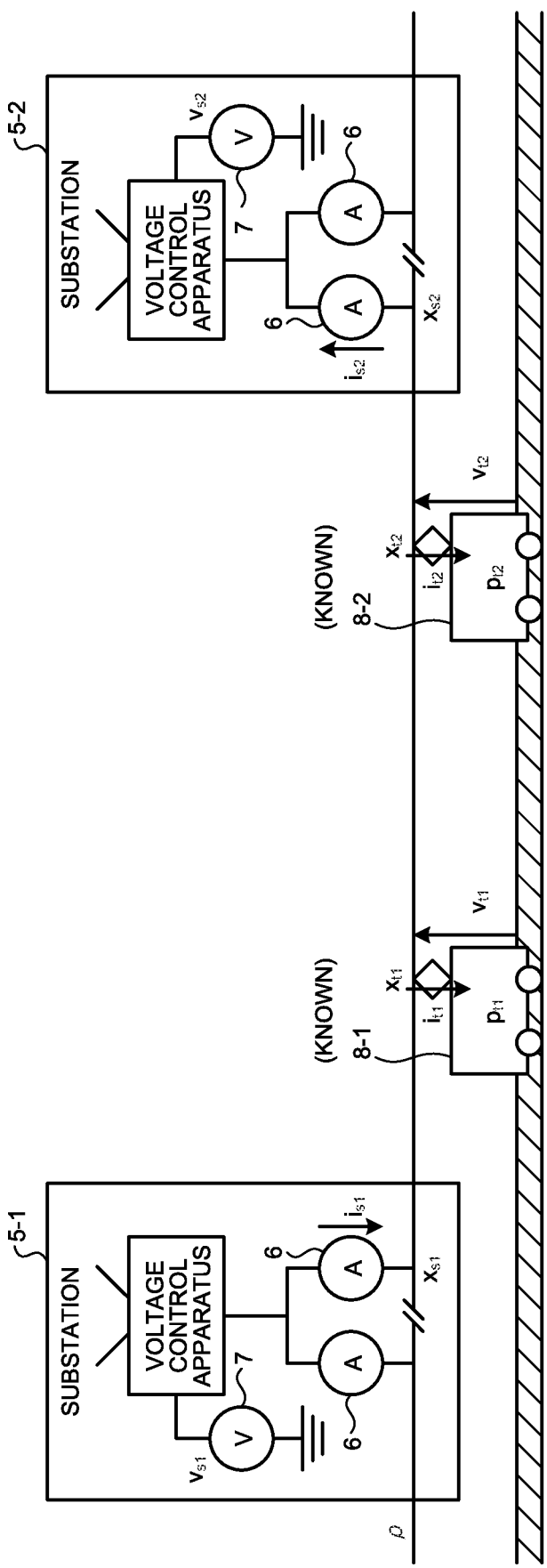
FIG. 7 is a diagram illustrating processing performed by the DC-feeding-voltage calculating apparatus according to the first embodiment for estimating an on-rail state of an unknown train.

FIG. 7 is a diagram illustrating processing performed by the DC-feeding-voltage calculating apparatus 100 according to the first embodiment for estimating the on-rail state of the unknown train 9. Although the following explanation is made as to an example in which two known trains 8-1 and 8-2 exist between the two substations 5-1 and 5-2, one or more than two known trains 8 may exist between the two substations 5-1 and 5-2. Variables regarding the known train 8-1 are defined as follows: reference sign "$x_{t1}$" represents an on-rail position; reference sign "$v_{t1}$" represents a voltage value of a pantograph point voltage; reference sign "$i_{t1}$" represents a value of an electric current supplied from the overhead line; and reference sign "$p_{t1}$" represents train power. Variables regarding the known train 8-2 are defined as follows: reference sign "$x_{t2}$" represents an on-rail position; reference sign "$v_{t2}$" represents a value of a pantograph point voltage; reference sign "$i_{t2}$" represents a value of an electric current supplied from the overhead line; and reference sign "$p_{t2}$" represents train power. The trains 8-1 and 8-2 have the same configuration as the train 8 illustrated in FIG. 1.

When an unknown train is absent between the substation 5-1 and the train 8-1, Expression (14) can be obtained from Expression (1) to Expression (3) described above.

[Expression 14]

$$v_{s1} - v_{t1} = \rho(x_{t1}, x_{s1}) i_{s1} \quad (14)$$

Similarly, when an unknown train is absent between the train 8-1 and the train 8-2, Expression (15) can be obtained from Expression (1) to Expression (3) described above.

[Expression 15]

$$v_{t1} - v_{t2} = \rho(x_{t2} - x_{t1})(i_{s2} + i_{t2}) \quad (15)$$

When an unknown train is absent between the train 8-2 and the substation 5-2, Expression (16) can be obtained from Expression (1) to Expression (3) described above.

[Expression 16]

$$v_{t2} - v_{s2} = \rho(x_{s2} - x_{t2}) i_{s2} \quad (16)$$

Note that, in reality, errors are included in current values and voltage values measured in the substation 5 and the train 8. For this reason, Expression (14) to Expression (16) can fail to hold in spite of the absence of an unknown train. In view of Expression (14) to Expression (16) indicating voltages, the train-operation-information estimating unit 2 regards Expression (14) to Expression (16) as holding when an error is within the threshold of $\pm \Delta V$ (V).

Each of Expression (14) to Expression (16) holds when the unknown train 9 is absent between the corresponding two of the substations 5-1 and 5-2 and the known trains 8-1 and 8-2. Each of Expression (14) to Expression (16) does not hold when the unknown train 9 is present in the corresponding subsection and is regenerating or power running. That is, when the unknown train 9 exists in one of subsections separated from one another by the substation 5 or the known train 8, one of Expressions (14) to (16) that corresponds to this one subsection does not hold. In particular, when Expression (17) holds, the train-operation-information estimating unit 2 can estimate that the unknown train 9 exists between the substation 5-1 and the train 8-1.

[Expression 17]

$$v_{s1} - v_{t1} \neq \rho(x_{t1} - x_{s1}) i_{s1} \cap v_{t1} - v_{t2} = \rho(x_{t2} - x_{t1})(i_{s2} + i_{t2})$$
$$\cap v_{t2} - v_{s2} = \rho(x_{s2} - x_{t2}) i_{s2} \tag{17}$$

When Expression (18) holds, the train-operation-information estimating unit 2 can estimate that an unknown train exists between the train 8-1 and the train 8-2.

[Expression 18]

$$v_{s1} - v_{t1} = \rho(x_{t1} - x_{s1}) i_{s1} \cap v_{t1} - v_{t2} \neq \rho(x_{t2} - x_{t1})(i_{s2} + i_{t2})$$
$$\cap v_{t2} - v v_{s2} = \rho(x_{s2} - x_{t2}) i_{s2} \tag{18}$$

When Expression (19) holds, the train-operation-information estimating unit 2 can estimate that an unknown train is on-rail between the train 8-2 and the substation 5-2.

[Expression 19]

$$v_{s1} - v_{t1} = \rho(x_{t1} - x_{s1}) i_{s1} \cap v_{t1} - v_{t2} = \rho(x_{t2} - x_{t1})(i_{s2} - i_{t2})$$
$$\cap v_{t2} - v_{s2} \neq \rho(x_{s2} - x_{t2}) i_{s2} \tag{19}$$

Figure 8:
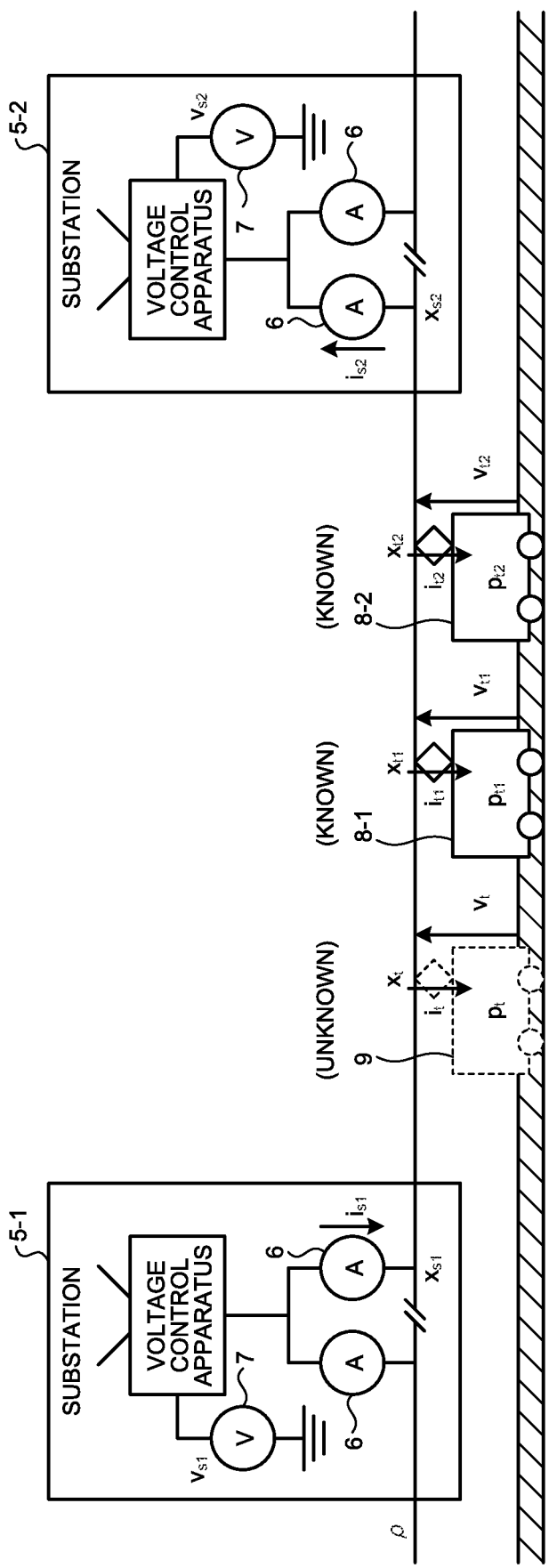
FIG. 8 is a diagram illustrating processing performed by the DC-feeding-voltage control apparatus according to the first embodiment for estimating an on-rail state of an unknown train between a substation and a known train.

Using Expression (1) to Expression (8) described above, the train-operation-information estimating unit 2 can estimate the following four ones concerning an unknown train: an on-rail position; a pantograph point voltage; an electric current supplied from the overhead line; and train power. That is, when the DC electrified section is divided into a plurality of subsections by the positions of the substations 5-1 and 5-2 and the on-rail positions of the trains 8-1 and 8-2, the train-operation-information estimating unit 2 estimates presence or absence of the unknown train 9 in each of the subsections. The train-operation-information estimating unit 2 estimates second train information in the subsection where the presence of the unknown train 9 is estimated. A discussion is made with reference to FIG. 8 as to an example in which an unknown train exists between the substation 5-1 and the train 8-1. FIG. 8 is a diagram illustrating processing performed by the DC-feeding-voltage calculating apparatus 100 according to the first embodiment for estimating an on-rail state of the unknown train 9 between the substation 5-1 and the known train 8-1. Variables concerning the unknown train 9 are defined as follows: reference sign "$x_t$" represents an on-rail position; reference sign "$v_t$" represents a value of a pantograph point voltage; reference sign "$i_t$" represents a value of an electric current supplied from the overhead line; and reference sign "$p_t$" represents train power. The train-operation-information estimating unit 2 can obtain Expression (20) to Expression (23) in the same manner as Expression (1) to Expression (4) described above.

[Expression 20]

$$v_{s1} - v_t = \rho(x_t - x_{s1}) i_{s1} \tag{20}$$

[Expression 21]

$$v_t - v_{t1} = \rho(x_{t1} - x_t)(i_{s1} - i_t) \tag{21}$$

[Expression 22]

$$i_{s1} - i_t - i_{t1} - i_{t2} = i_{s2} \tag{22}$$

[Expression 23]

$$p_t = v_t i_t \tag{23}$$

The train-operation-information estimating unit 2 can obtain Expression (24) to Expression (27) from Expression (20) to Expression (23) described above and can estimate the on-rail position $x_t$ of, the pantograph point voltage $v_t$ of, the electric current $i_t$ supplied from the overhead line to, and the train power $p_t$ of, the unknown train 9.

[Expression 24]

$$x_t = \frac{v_{s1} - v_{t1} + \rho x_{s1} i_{s1} - \rho x_{t1}(i_{t1} + i_{t2} + i_{s2})}{\rho(i_{s1} - i_{t1} - i_{t2} - i_{s2})} \tag{24}$$

[Expression 25]

$$i_t = i_{s1} - i_{t1} - i_{t2} - i_{s2} \tag{25}$$

[Expression 26]

$$v_t = \frac{v_{t1} i_{s1} - (v_{s1} - \rho x_{t1} i_{s1} - \rho x_{s1} i_{s1})(i_{t1} + i_{t2} + i_{s2})}{i_{s1} - i_{t1} - i_{t2} - i_{s2}} \tag{26}$$

[Expression 27]

$$p_t = v_{t1} i_{s1} - (v_{s1} - \rho x_{t1} i_{s1} + \rho x_{s1} i_{s1})(i_{t1} + i_{t2} + i_{s2}) \tag{27}$$

In this way, the train-operation-information estimating unit 2 can estimate the on-rail position $x_t$ of, the pantograph point voltage $v_t$ of, the electric current $i_t$ supplied from the overhead line to, and the train power $p_t$ of, the unknown train 9 on the basis of the model information 10, the substation information 50 acquired from the substations 5-1 and 5-2, and the train information 80 acquired from the known train 8. The train-operation-information estimating unit 2 can calculate regeneratable power of the unknown train 9 by using Expression (9) to Expression (13).

Figure 9:
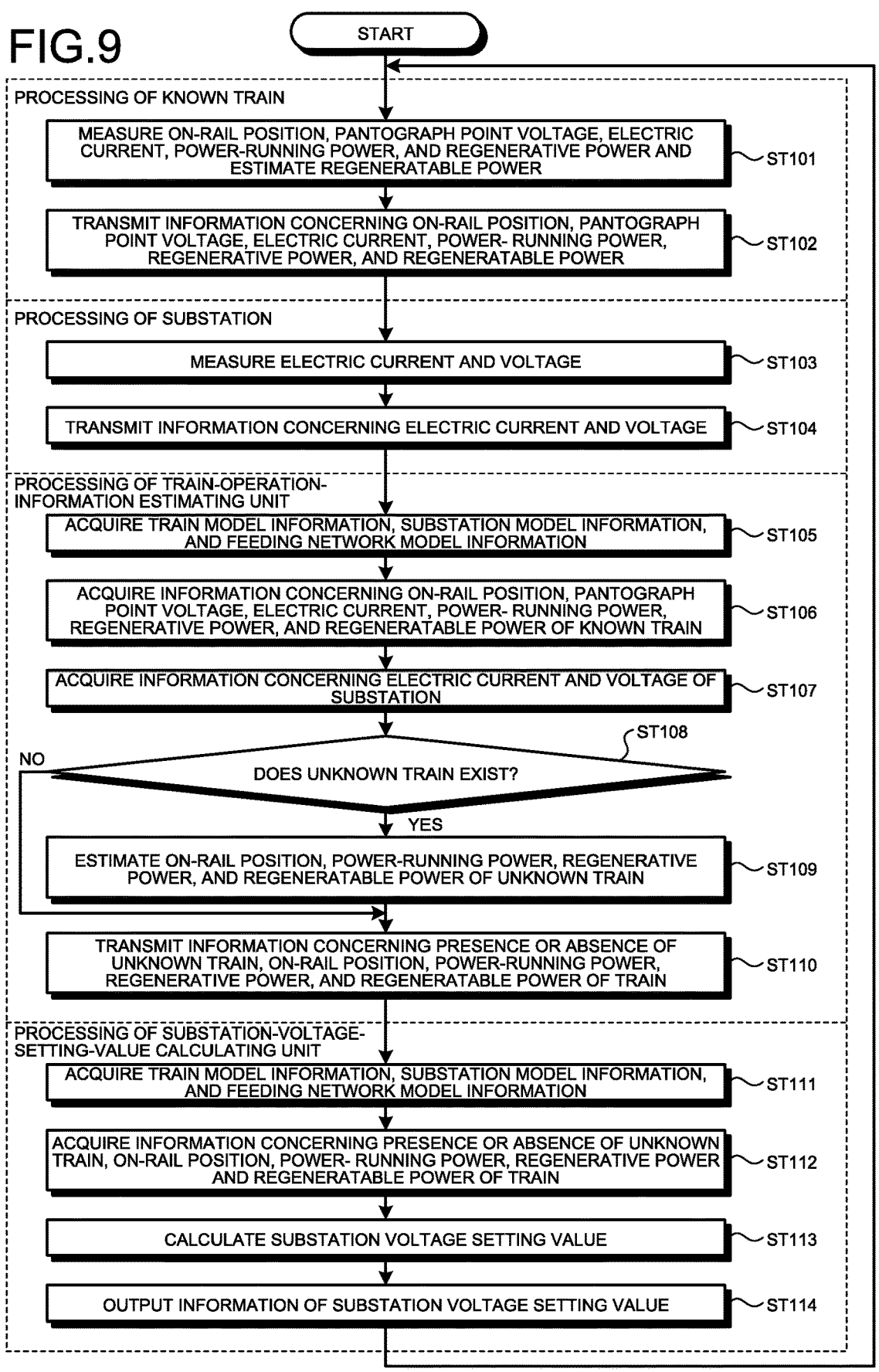
FIG. 9 is a flowchart illustrating an example of DC-feeding-voltage control processing performed by the DC-feeding-voltage control system according to the first embodiment.

DC-feeding-voltage control processing in the DC-feeding-voltage control system 200 according to this embodiment is explained here. FIG. 9 is a flowchart illustrating an example of the DC-feeding-voltage control processing performed by the DC-feeding-voltage control system 200 according to the first embodiment.

The known train 8 quipped with the wireless communication apparatus 81 measures an on-rail position of, a pantograph point voltage of, an electric current supplied from the overhead line to, power-running power of, and regenerative power of the train 8 (step ST101). The train 8 further estimates regeneratable power (step ST101). The train 8 transmits the train information 80 to the DC-feeding-voltage calculating apparatus 100 (step ST102). The train information 80 is information concerning the measured on-rail position, the measured pantograph point voltage, the measured electric current supplied from the overhead line, the measured power-running power, the measured regenerative power, and the estimated regeneratable power. In the DC-feeding-voltage calculating apparatus 100, the wireless communication unit 4 receives the train information 80 via the network 400 illustrated in FIG. 2 and outputs the received train information 80 to the train-operation-information estimating unit 2.

In the substation 5, the current sensors 6 set on the feeders by train direction measure electric currents and the voltage sensor 7 measures a voltage (step ST103). The substation 5 transmits the substation information 50 to the train-operation-information estimating unit 2 (step ST104). The substation information 50 is information concerning the electric currents measured by the current sensors 6 and the voltage measured by the voltage sensor 7. In the DC-feeding-voltage calculating apparatus 100, the train-operation-information estimating unit 2 receives the substation information 50 via the network 400 illustrated in FIG. 2.

The train-operation-information estimating unit 2 acquires the model information 10 stored in the model-information storing unit 1 (step ST105). The model information 10 is the three pieces of information: the train model information; the substation model information; and the feeding network model information. The train-operation-information estimating unit 2 acquires the train information 80 from the known train 8 (step ST106). The train information 80 is the information concerning the on-rail position of, the pantograph point voltage of, the electric current supplied from the overhead line to, the power-running power of, the regenerative power of, and the regeneratable power of, the known train 8. The train-operation-information estimating unit 2 acquires the substation information 50 from the substation 5 (step ST107). The substation information 50 is the information concerning the electric currents measured by the current sensors 6 and the voltage measured by the voltage sensor 7 of the substation 5.

On the basis of the acquired model information 10, the acquired train information 80, and the acquired substation information 50, the train-operation-information estimating unit 2 determines whether the unknown train 9 exists in the DC electrified section controlled by the DC-feeding-voltage control system 200 (step ST108). When the train-operation-information estimating unit 2 estimates that the unknown train 9 exits (Yes at step ST108), the train-operation-information estimating unit 2 estimates an on-rail position of, a power-running voltage of, regenerative power of, and regeneratable power of, the unknown train 9 on the basis of the acquired model information 10, the acquired train information 80, and the acquired substation information 50 (step ST109). When the train-operation-information estimating unit 2 estimates that the unknown train 9 does not exist (No at step ST108), the train-operation-information estimating unit 2 omits the processing at step ST109. The train-operation-information estimating unit 2 transmits the train operation information 20 to the substation-voltage-setting-value calculating unit 3 (step ST110). The train operation information 20 includes the information concerning: the presence or absence of the unknown train 9; and the on-rail position of, the power-running voltage of, the regenerative power of, and the regeneratable power of, the train. When the unknown train 9 exists, the train-operation-information estimating unit 2 includes, in the train operation information 20, the information concerning the on-rail positions of, the power-running voltages of, the regenerative power of, and the regeneratable power of, the trains 8 and 9. When the unknown train 9 does not exist, the train-operation-information estimating unit 2 includes, in the train operation information 20, the information concerning the on-rail position of, the power-running voltage of, the regenerative power of, and the regeneratable power of, the train 8.

The substation-voltage-setting-value calculating unit 3 acquires from the model-information storing unit 1 the model information 10, i.e., the train model information, the substation model information, and the feeding network model information (step ST111). The substation-voltage-setting-value calculating unit 3 acquires from the train-operation-information estimating unit 2 the train operation information 20, i.e., the information concerning: the on-rail presence or absence of the unknown train 9; and the on-rail position of, the power-running voltage of, the regenerative power of, and the regeneratable power of, the train (step ST112). On the basis of the acquired model information 10 and the acquired train operation information 20, the substation-voltage-setting-value calculating unit 3 calculates the substation voltage setting value 30 of the substation 5 (step ST113) and outputs information concerning the calculated substation voltage setting value 30 to the substation 5 (step ST114).

The substation 5 acquires the information concerning the substation voltage setting value 30 via the network 400 illustrated in FIG. 2 and controls, on the basis of the information concerning the substation voltage setting value 30, a substation voltage.

By carrying out the processing explained above, the DC-feeding-voltage calculating apparatus 100 can estimate the train operation information 20 even when a train not equipped with a wireless communication apparatus exits. As a result, the DC-feeding-voltage calculating apparatus 100 can determine an optimum substation voltage, and thus enable effective utilization of the regenerative power.

Note that, in FIG. 9, the order is such that the processing by the substation 5 is performed after the processing by the train 8. Such an order is merely an example, and the order can be such that the processing by the train 8 is performed after the processing by the substation 5, the order can be such that the processing by the train 8 and the processing by the substation 5 can be performed in parallel.

A hardware configuration of the DC-feeding-voltage calculating apparatus 100 is explained here. In the DC-feeding-voltage calculating apparatus 100, the model-information storing unit 1 is implemented by a memory. The wireless communication unit 4 is implemented by an interface circuit of wireless communication. The train-operation-information estimating unit 2 and the substation-voltage-setting-value calculating unit 3 are implemented by processing circuits. That is, the DC-feeding-voltage calculating apparatus 100 includes a processing circuit for estimating an on-rail position, a power running voltage, regenerative power, and regeneratable power of the unknown train 9 and also for calculating the substation voltage setting value 30 of the substation 5. The processing circuit can be dedicated hardware or can be a Central Processing Unit (CPU) and a memory, with the CPU executing programs stored in the memory.

Figure 10:
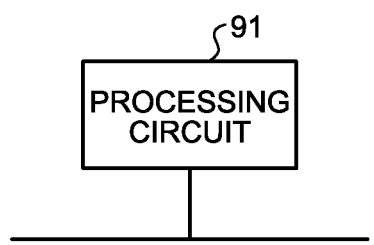
FIG. 10 is a diagram illustrating an example in which the train-operation-information estimating unit and a substation-voltage-setting-value calculating unit of the DC-feeding-voltage calculating apparatus according to the first embodiment are configured from dedicated hardware.

FIG. 10 is a diagram illustrating an example in which the train-operation-information estimating unit 2 and the substation-voltage-setting-value calculating unit 3 of the DC-feeding-voltage calculating apparatus 100 according to the first embodiment are configured from dedicated hardware. When the processing circuit is dedicated hardware, a processing circuit 91 illustrated in FIG. 10 corresponds to, for example, a single circuit, a composite circuit, a programmed processor, a processor employing parallel programming, an Application Specific Integrated Circuit (ASIC), a Field Programmable Gate Array (FPGA), or a combination of the foregoing. Each of the functions of the train-operation-information estimating unit 2 and the substation-voltage-setting-value calculating unit 3 can be implemented by the processing circuit 91. The functions can be collectively implemented by the processing circuit 81.

Figure 11:
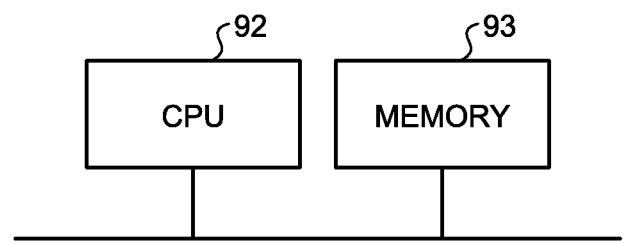
FIG. 11 is a diagram illustrating an example in which the train-operation-information estimating unit and the substation-voltage-setting-value calculating unit of the DC-feeding-voltage calculating apparatus according to the first embodiment are configured from a CPU and a memory.

FIG. 11 is a diagram illustrating an example in which the train-operation-information estimating unit 2 and the substation-voltage-setting-value calculating unit 3 of the DC-feeding-voltage calculating apparatus 100 according to this embodiment are configured from a CPU and a memory. When the processing circuit is configured from a CPU 92 and a memory 93, the functions of the train-operation-information estimating unit 2 and the substation-voltage-setting-value calculating unit 3 are implemented by software, firmware, or a combination of software and firmware. The software or the firmware is described as a program and stored in the memory 93. In the processing circuit, the CPU 92 reads and executes the program stored in the memory 93 to thereby implement the functions. That is, the DC-feeding-voltage calculating apparatus 100 includes the memory 93 for storing a program in which, when the train-operation-information estimating unit 2 and the substation-voltage-setting-value calculating unit 3 are executed by the processing circuit, a step of estimating an on-rail position, a power running voltage, regenerative power, and regeneratable power of the unknown train 9 and a step of calculating the substation voltage setting value 30 of the substation 5 are consequently executed. These programs are considered to be programs for causing a computer to execute a procedure and a method of the DC-feeding-voltage calculating apparatus 100. The CPU 92 can be a processing device, an arithmetic device, a microprocessor, a microcomputer, a processor, a Digital Signal Processor (DSP), or the like. The memory 93 corresponds to, for example, a nonvolatile or volatile semiconductor memory such as a Random Access Memory (RAM), a Read Only Memory (ROM), a flash memory, an Erasable Programmable ROM (EPROM), or an Electrically EPROM (EEPROM), a magnetic disk, a flexible disk, an optical disk, a compact disk, a minidisk, or a Digital Versatile Disc (DVD). A memory implementing the model-information storing unit 1 can be the same as the memory 93.

Note that, concerning the functions of the train-operation-information estimating unit 2 and the substation-voltage-setting-value calculating unit 3, some of the functions can be implemented by dedicated hardware and some of the functions can be implemented by software or firmware. For example, the function of the train-operation-information estimating unit 2 can be implemented by the processing circuit 91 functioning as dedicated hardware. The function of the substation-voltage-setting-value calculating unit 3 can be implemented by the CPU 92 reading and executing the program stored in the memory 93.

In this way, the processing circuit can implement the functions explained above with the dedicated hardware, the software, the firmware, or a combination of the foregoing.

As explained above, on the basis of: the model information 10 including the position information on the substation 5 including the voltage sensor 7 and the current sensors 6 set on the feeders by train traveling direction; the electric currents detected by the current sensors 6; the voltage detected by the voltage sensor 7; and the train information 80 acquired from the known train 8, the DC-feeding-voltage calculating apparatus 100 according to this embodiment is configured to calculate the substation voltage setting value 30 for controlling the substation voltage such that there in an increase in the regenerative power of the regenerative car existing in the DC electrified section. The DC-feeding-voltage calculating apparatus 100 then outputs the substation voltage setting value 30 to the substations 5. This configuration makes it possible to estimate a train state while reducing cost, even when the train 9 not equipped with a wireless communication apparatus exists. As a result, it is possible to determine an optimum substation voltage, and thus enable more effective utilization of regenerative power while reducing cost.

The DC-feeding-voltage calculating apparatus 100 according to this embodiment includes the model-information storing unit 1 that stores the model information 10. The model information 10 includes: train model information including information for controlling a regenerative power reducing amount in a train existing in the DC electrified section; feeding network model information including position information on the substation 5; and substation model information including control information on a substation voltage. The DC-feeding-voltage calculating apparatus 100 includes the train-operation-information estimating unit 2. The train-operation-information estimating unit 2 estimates second train information on a train existing in the DC electrified section and not equipped with a wireless communication apparatus, on the basis of: the model information 10; a voltage value and current values of the feeders by train direction, the voltage and current values being measured in the substation 5; and first train information on the train 8 equipped with the wireless communication apparatus 81. The train-operation-information estimating unit 2 outputs train operation information including the first train information and the second train information. The DC-feeding-voltage calculating apparatus 100 includes the substation-voltage-setting-value calculating unit 3 that, on the basis of the model information 10 and the train operation information 20, calculates the substation voltage setting value 30 for controlling a substation voltage such that there in an increase in regenerative power in a regenerative car existing in the DC electrified section and outputs the substation voltage setting value 30 to the substations 5. Consequently, it is possible to accurately calculate the substation voltage setting value 30 and enable more effective utilization of the regenerative power.

On the basis of the model information 10 stored in the model-information storing unit 1 and electric currents and voltages measured in the substation 5 and the train 8, the train-operation-information estimating unit 2 is configured to estimate second train information on the train 9 existing in the DC electrified section between the substation 5-1 and the substation 5-2 and not equipped with a wireless communication apparatus. Therefore, it is possible to improve calculation accuracy of the substation voltage setting value 30 in the substation-voltage-setting-value calculating unit 3.

In the example configuration explained above, the train-operation-information estimating unit 2 estimates the second train information using the model information 10 stored in the model-information storing unit 1. However, the model information 10 can be set in the train-operation-information estimating unit 2 in advance or the model information 10 can be input to the train-operation-information estimating unit 2 from an external source, i.e., not from the DC-feeding-voltage calculating apparatus 100.

Second Embodiment

In a second embodiment, the known train 8 does not estimate regeneratable power but the train-operation-information estimating unit 2 does estimate regeneratable power of the known train 8. Differences from the first embodiment are explained here.

Figure 12:
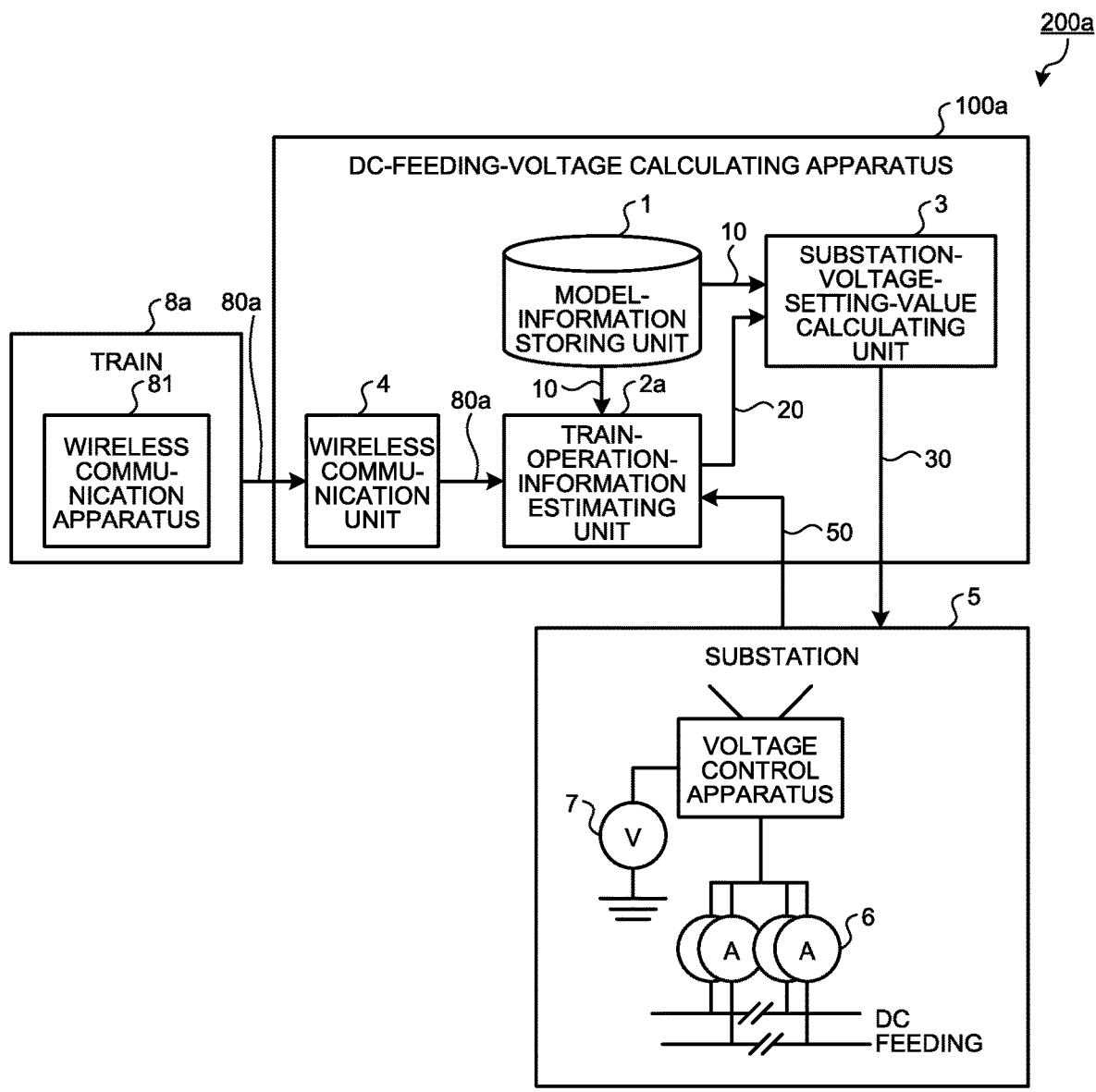
FIG. 12 is a block diagram illustrating an example configuration of a DC-feeding-voltage calculating apparatus according to a second embodiment.

FIG. 12 is a block diagram illustrating an example configuration of a DC-feeding-voltage calculating apparatus 100a according to the second embodiment. The DC-feeding-voltage calculating apparatus 100a has a configuration in which the train-operation-information estimating unit 2 of the DC-feeding-voltage calculating apparatus 100 is replaced with a train-operation-information estimating unit 2*a*. In a DC-feeding-voltage control system 200*a*, a train 8*a* equipped with the wireless communication apparatus 81 is connected to the DC-feeding-voltage calculating apparatus 100*a*.

The second embodiment is different from the first embodiment in that regeneratable power is not included in train information 80*a* transmitted from a known train 8*a*. Therefore, in the second embodiment, the train-operation-information estimating unit 2*a* estimates regeneratable power of the unknown train 9 and also estimates regeneratable power of the known train 8*a*. In the train-operation-information estimating unit 2*a*, the method for estimating regeneratable power of the known train 8*a* is the same as the method for estimating regeneratable power of the unknown train 9 in the first embodiment.

Figure 13:
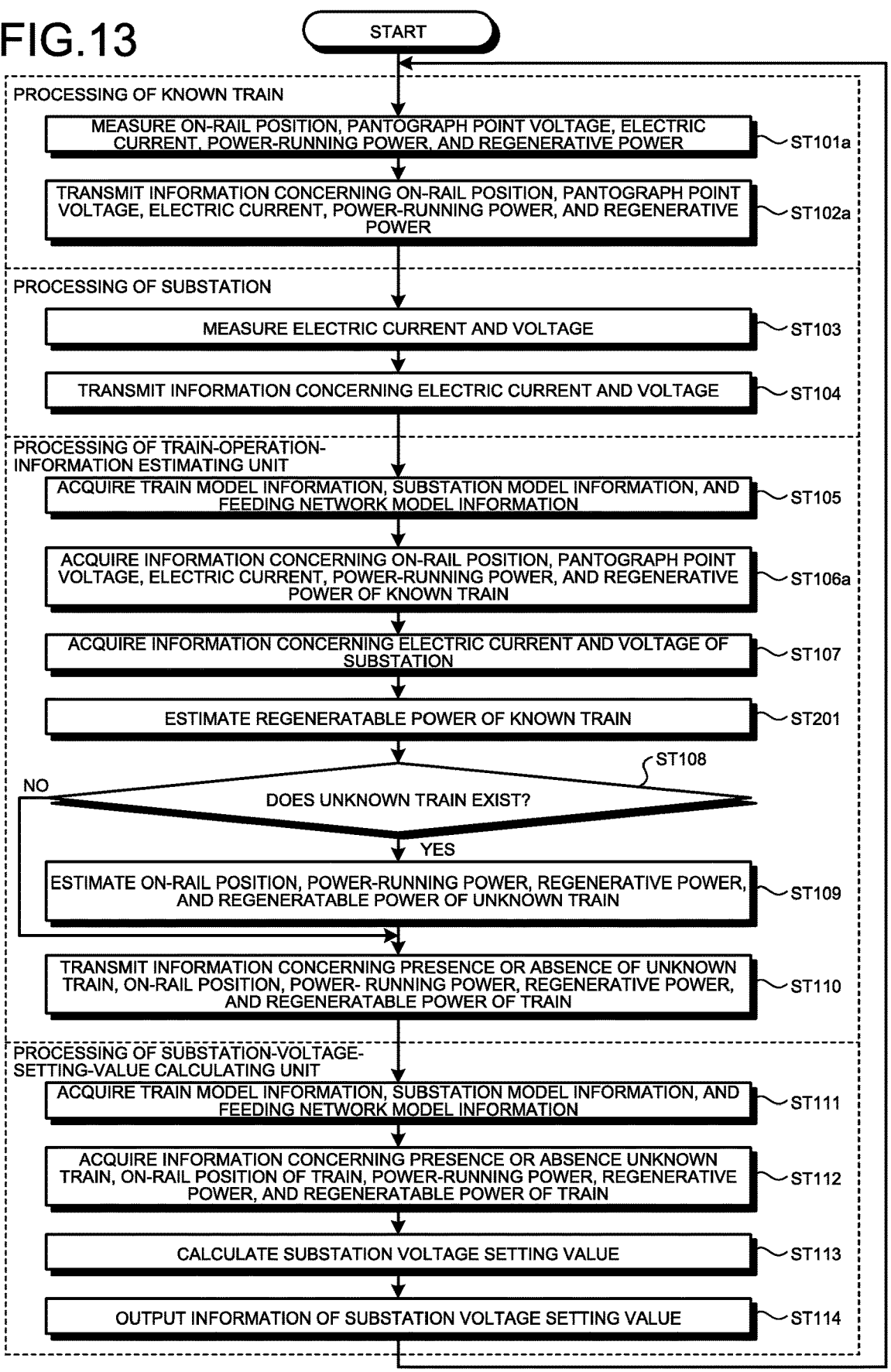
FIG. 13 is a flowchart illustrating an example of DC-feeding-voltage control processing in a DC-feeding-voltage control system according to the second embodiment.

DC-feeding-voltage control processing in the DC-feeding-voltage control system 200*a* according to the second embodiment is explained here. FIG. 13 is a flowchart illustrating an example of the DC-feeding-voltage control processing in the DC-feeding-voltage control system 200 according to the second embodiment.

The known train 8*a* equipped with the wireless communication apparatus 81 measures an on-rail position of, a pantograph point voltage of, an electric current supplied from an overhead line to, power-running power of, and regenerative power of, the known train 8 (step ST101*a*). The known train 8*a* transmits the train information 80*a* to the DC-feeding-voltage calculating apparatus 100 (step ST102*a*). The train information 80*a* is information concerning: the measured on-rail position; the measured pantograph point voltage; the measured electric current supplied from the overhead line; the measured power-running power; and the measured regenerative power. Processing performed by the substation 5 is the same as the processing in the first embodiment.

The train-operation-information estimating unit 2*a* acquires the model information 10 stored in the model-information storing unit 1 (step ST105). The model information 10 is the three pieces of information: the train model information; substation model information; and feeding network model information. The train-operation-information estimating unit 2*a* acquires the train information 80*a* from the known train 8*a* (step ST106*a*). The train information 80*a* is the information concerning the on-rail position of, the pantograph point voltage of, the electric current supplied from the overhead line to, the power-running power of, and the regenerative power of, the known train 8*a*. The train-operation-information estimating unit 2*a* acquires the substation information 50 from the substation 5 (step ST107). The substation information 50 is the information concerning the electric currents measured by the current sensors 6 and the voltage measured by the voltage sensor 7 of the substation 5.

The train-operation-information estimating unit 2*a* estimates regeneratable power of the known train 8*a* on the basis of the train information 80*a* (step ST201). On the basis of the acquired model information 10, the acquired train information 80*a*, and the acquired substation information 50, the train-operation-information estimating unit 2*a* determines whether the unknown train 9 exists in a DC electrified section controlled by the DC-feeding-voltage control system 200*a* (step ST108). When the train-operation-information estimating unit 2*a* estimates that the unknown train 9 exists (Yes at step ST108), the train-operation-information estimating unit 2*a* estimates an on-rail position of, a power running voltage of, regenerative power of, and regeneratable power of, the unknown train 9 on the basis of the acquired model information 10, the acquired train information 80*a*, and the acquired substation information 50 (step ST109). When the train-operation-information estimating unit 2*a* estimates that the unknown train 9 does not exist (No at step ST108), the train-operation-information estimating unit 2*a* omits the processing at step ST109. The train-operation-information estimating unit 2*a* transmits the train operation information 20 to the substation-voltage-setting-value calculating unit 3 (step ST110). The train operation information 20 includes information concerning: presence or absence of the unknown train 9; and the on-rail position of, the power-running voltage of, the regenerative power of, and the regeneratable power of, the train. When the unknown train 9 exists, the train-operation-information estimating unit 2*a* includes, in the train operation information 20, information concerning the on-rail positions of, the power-running voltages of, the regenerative power of, and the regeneratable power of, the trains 8*a* and 9. When the unknown train 9 does not exist, the train-operation-information estimating unit 2*a* includes, in the train operation information 20, information concerning the on-rail position of, the power running voltage of, the regenerative power of, and the regeneratable power of, the train 8. Processing performed by the substation-voltage-setting-value calculating unit 3 is the same as the processing in the first embodiment.

As explained above, the DC-feeding-voltage calculating apparatus 100*a* according to this embodiment estimates the regeneratable power of the known train 8*a*. Even in this case, the DC-feeding-voltage control system 200*a* can obtain the same effects as the effects in the first embodiment. While the load on the train-operation-information estimating unit 2*a* of the DC-feeding-voltage calculating apparatus 100*a* is increased due to the processing load for estimating the regeneratable power of the known train 8*a*, the processing load on the train 8*a* can be reduced accordingly. Since the processing load on the train 8*a* is reduced, the configuration of the train 8*a*, which outnumbers the DC-feeding-voltage calculating apparatus 100*a*, is simple as compared with the train 8 in the first embodiment.

Third Embodiment

In a third embodiment, a wireless communication unit of a DC-feeding-voltage calculating apparatus outputs train information acquired from a known train to a train-operation-information estimating unit and a substation-voltage-setting-value calculating unit. Differences from the first embodiment are explained here.

Figure 14:
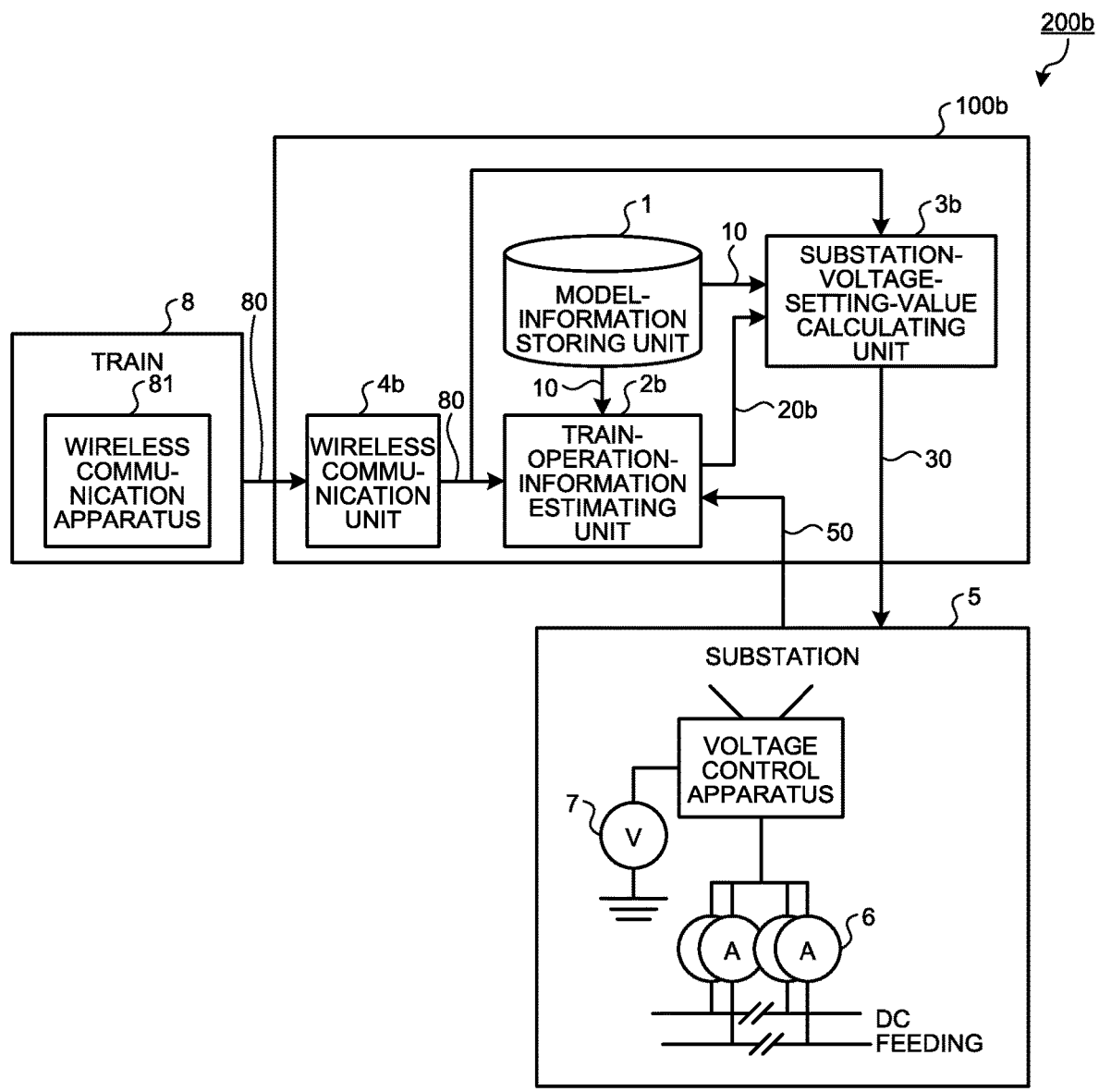
FIG. 14 is a block diagram illustrating an example configuration of a DC-feeding-voltage calculating apparatus according to a third embodiment.

FIG. 14 is a block diagram illustrating an example configuration of a DC-feeding-voltage calculating apparatus 100*b* according to the third embodiment. The DC-feeding-voltage calculating apparatus 100*b* has a configuration in which the train-operation-information estimating unit 2, the substation-voltage-setting-value calculating unit 3, and the wireless communication unit 4 of the DC-feeding-voltage calculating apparatus 100 are replaced with a train-operation-information estimating unit 2*b*, a substation-voltage-setting-value calculating unit 3*b*, and a wireless communication unit 4*b*, respectively.

The wireless communication unit 4*b* receives the train information 80 transmitted from the train 8 and outputs the received train information 80 to the train-operation-information estimating unit 2*b* and the substation-voltage-setting-value calculating unit 3*b*.

The train-operation-information estimating unit 2*b* performs the same estimation processing as the estimation processing performed by the train-operation-information estimating unit 2 in the first embodiment. However, the train-operation-information estimating unit 2*b* is different from the train-operation-information estimating unit 2 in the first embodiment 1 in that the train information 80 is not included in train operation information 20*b*, which is information transmitted to the substation-voltage-setting-value calculating unit 3*b*.

On the basis of the model information 10 stored in the model-information storing unit 1, the train operation information 20*b* estimated by the train-operation-information estimating unit 2*b*, and the train information 80 acquired from the train 8, the substation-voltage-setting-value calculating unit 3*b* calculates the substation voltage setting value 30 for controlling a substation voltage such that regenerative power is increased in a regenerative car existing in a DC electrified section and outputs the calculated substation voltage setting value 30 to the substation 5. In the substation-voltage-setting-value calculating unit 3*b*, processing for calculating the substation-voltage setting value 30 is the same as the processing in the substation-voltage-setting-value calculating unit 3 in the first embodiment, although the route of the information to be acquired is different.

Figure 15:
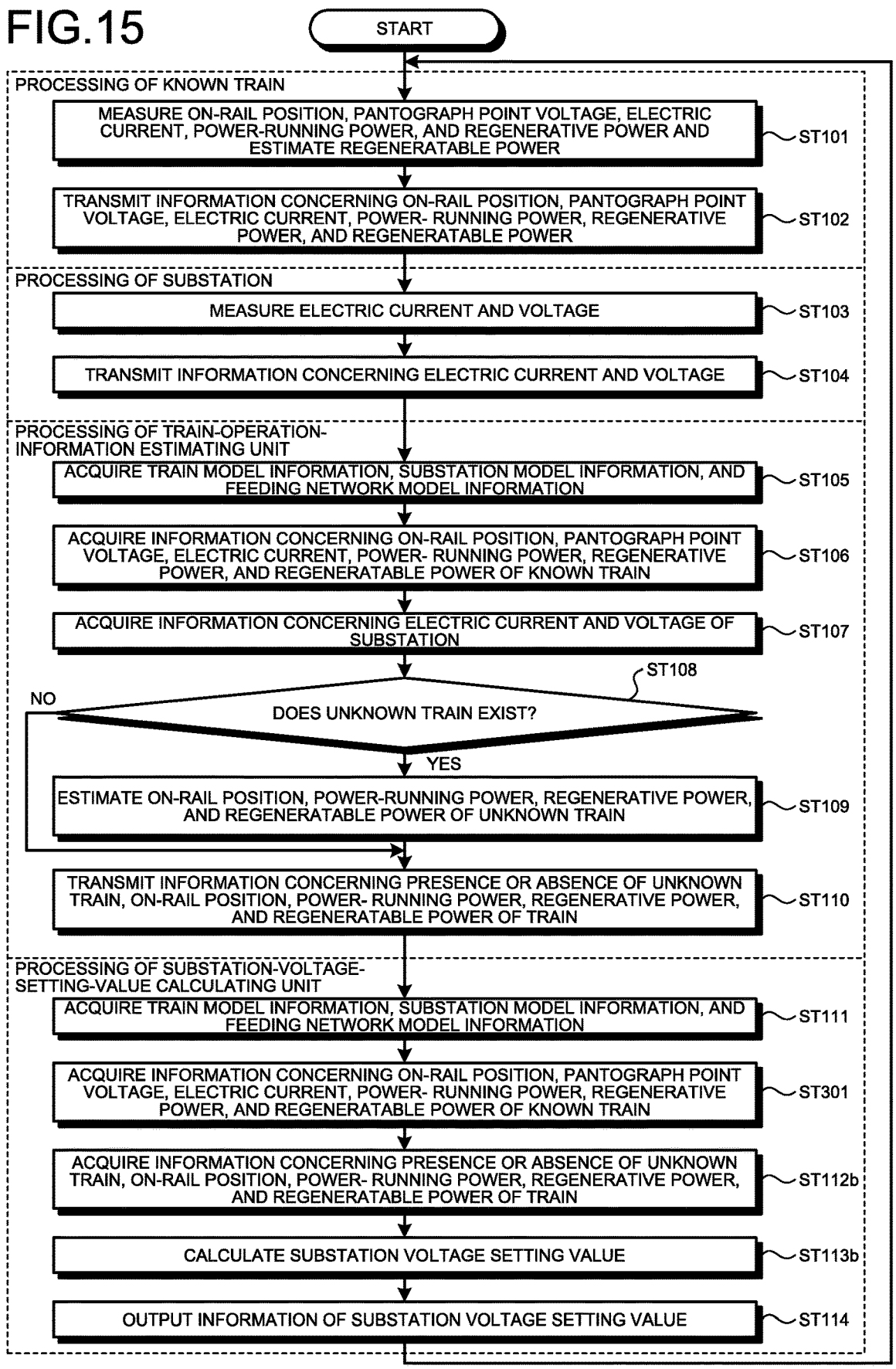
FIG. 15 is a flowchart illustrating an example of DC-feeding-voltage control processing performed by a DC-feeding-voltage control system according to the third embodiment.

DC-feeding-voltage control processing in a DC-feeding-voltage control system 200*b* according to the third embodiment is explained here. FIG. 15 is a flowchart illustrating an example of the DC-feeding-voltage control processing performed by the DC-feeding-voltage control system 200*b* according to the third embodiment.

Processing performed by the train 8 and the substation 5 is the same as the processing in the first embodiment. In the DC-feeding-voltage calculating apparatus 100*b*, the wireless communication unit 4*b* receives the train information 80 via the network 400 illustrated in FIG. 2 and outputs the received train information 80 to the train-operation-information estimating unit 2*b* and the substation-voltage-setting-value calculating unit 3*b*.

Processing at step ST105 to step ST109 of the train-operation-information estimating unit 2*b* is the same as the processing in the first embodiment. The train-operation-information estimating unit 2*b* transmits the train operation information 20*b* to the substation-voltage-setting-value calculating unit 3*b* (step ST110*b*). The train operation information 20*b* includes information concerning presence or absence of, the estimated on-rail position of, the estimated power-running power of, the estimated regenerative power of, and the estimated regeneratable power of, the unknown train 9.

The substation-voltage-setting-value calculating unit 3*b* acquires the model information 10 from the model-information storing unit 1 (step ST111). The model information 10 is the three pieces of information: the train model information; the substation model information; and the feeding network model information. The substation-voltage-setting-value calculating unit 3*b* acquires the train information 80 from the known train 8 (step ST301). The train information 80 is the information concerning the on-rail position of, the pantograph point voltage of, the electric current supplied from the overhead line to, the power-running power of, the regenerative power of, and the regeneratable power of, the known train 8. The substation-voltage-setting-value calculating unit 3*b* acquires the train operation information 20*b* from the train-operation-information estimating unit 2*b* (step ST112*b*). The train operation information 20*b* is the information concerning the on-rail presence or absence of, the on-rail position of, the power running voltage of, the regenerative power of, and the regeneratable power of, the unknown train 9. On the basis of the acquired model information 10, the acquired train information 80, and the acquired train operation information 20*b*, the substation-voltage-setting-value calculating unit 3*b* calculates the substation voltage setting value 30 of the substation 5 (step ST113*b*). The substation-voltage-setting-value calculating unit 3*b* outputs information concerning the calculated substation voltage setting value 30 to the substation 5 (step ST114).

As explained above, in the DC-feeding-voltage calculating apparatus 100*b* according to this embodiment, the wireless communication unit 4*b* receives the train information 80 from the known train 8 and outputs the train information 80 to the train-operation-information estimating unit 2 and the substation-voltage-setting-value calculating unit 3*b*. In this case, the DC-feeding-voltage control system 200*b* can obtain the same effects as the effects in the first embodiment. The train-operation-information estimating unit 2*b* of the DC-feeding-voltage calculating apparatus 100*b* does not have to include the train information 80 in the train operation information 20*b* transmitted to the substation-voltage-setting-value calculating unit 3*b*. Therefore, it is possible to reduce the transmission processing load in the train-operation-information estimating unit 2*b* compared with that of the train-operation-information estimating unit 2 in the first embodiment.

Fourth Embodiment

In the first embodiment, the known train 8 and the unknown train 9 exist between the two substations 5-1 and 5-2. However, a substation is sometimes absent at a terminal end of a route. In a fourth embodiment, as an example, the substation 5-2 is omitted and replaced with a voltage sensor 7. Differences from the first embodiment are explained here.

Figure 16:
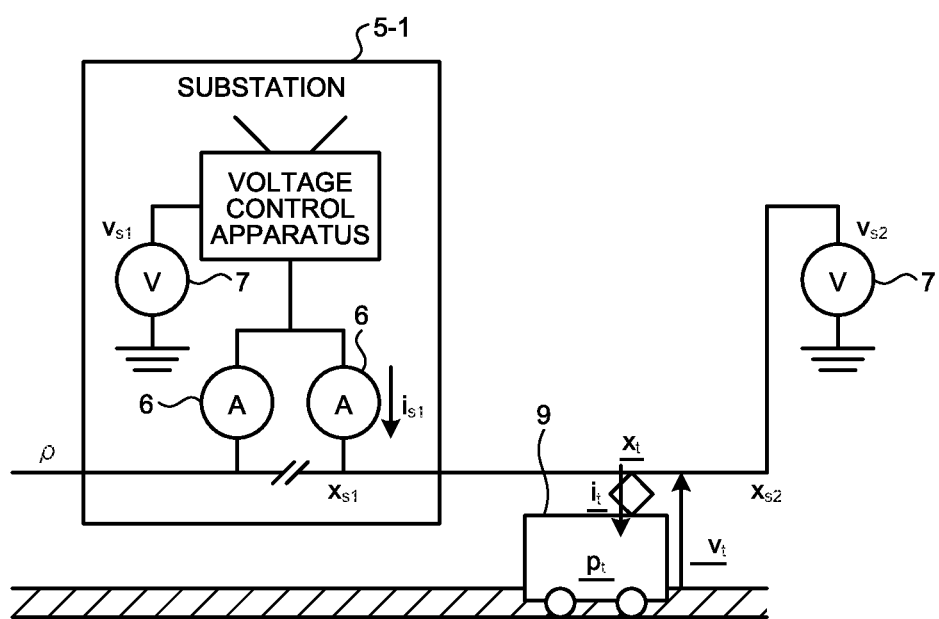
FIG. 16 is a diagram showing set variables used in estimation processing performed by a train-operation-information setting unit according to a fourth embodiment for estimating second train information.

The configuration of the DC-feeding-voltage calculating apparatus 100 is the same as the configuration in the first embodiment. FIG. 16 is a diagram showing set variables used in estimation processing performed by the train-operation-information estimating unit 2 according to the fourth embodiment for estimating second train information. FIG. 16 is the same as FIG. 4 except that the substation 5-2 is omitted from FIG. 4 in the first embodiment and replaced with the voltage sensor 7. Indication of voltages, electric currents, and the like concerning the substation 5-1 and the unknown train 9 is the same as the indication in FIG. 4. Position information on the voltage sensor 7 is, similarly to the position information substation 5-1 and the like, stored in the model-information storing unit 1 as feeding network model information. The electric current $i_{s2}$, which is indicated in the substation 5-2 of FIG. 4, is zero ($i_{s2}$=0) in FIG. 16. With electric current $i_{s2}$ being zero, the train-operation-information estimating unit 2 can estimate regeneratable power and the like of the unknown train 9 according to the same method as the method in the first embodiment. In FIG. 16, reference sign "$x_{s2}$" indicates the position of the voltage sensor 7 illustrated on the right side of FIG. 16 and reference sign "$v_{s2}$" indicates the voltage between an overhead line and a rail, the voltage being measured by the voltage sensor 7.

The first embodiment is explained above, but the explanation is applicable to the second and third embodiments as well.

As explained above, when the substation 5 is not set at a terminal end or the like of a route, the DC-feeding-voltage calculating apparatus 100 according to this embodiment uses the information concerning the position of the voltage sensor 7 set at a terminal end portion and the measured voltage. Consequently, the DC-feeding-voltage calculating apparatus 100 can estimate the regeneratable power and the like of the unknown train 9 according to the same method as the method in the first embodiment and can obtain the same effects as the effects in the first embodiment.

Fifth Embodiment

In the first embodiment, when the unknown train 9 exists in only any one of the sections among the substation 5-1, the train 8-1, the train 8-2, and the substation 5-2, the train-operation-information estimating unit 2 can estimate regeneratable voltage and the like of the unknown train 9. In a fifth embodiment, a method of estimating regeneratable voltages and the like of the unknown trains 9 when unknown trains 9 exist in a plurality of sections is explained. Differences from the first embodiment are explained here.

Figure 17:
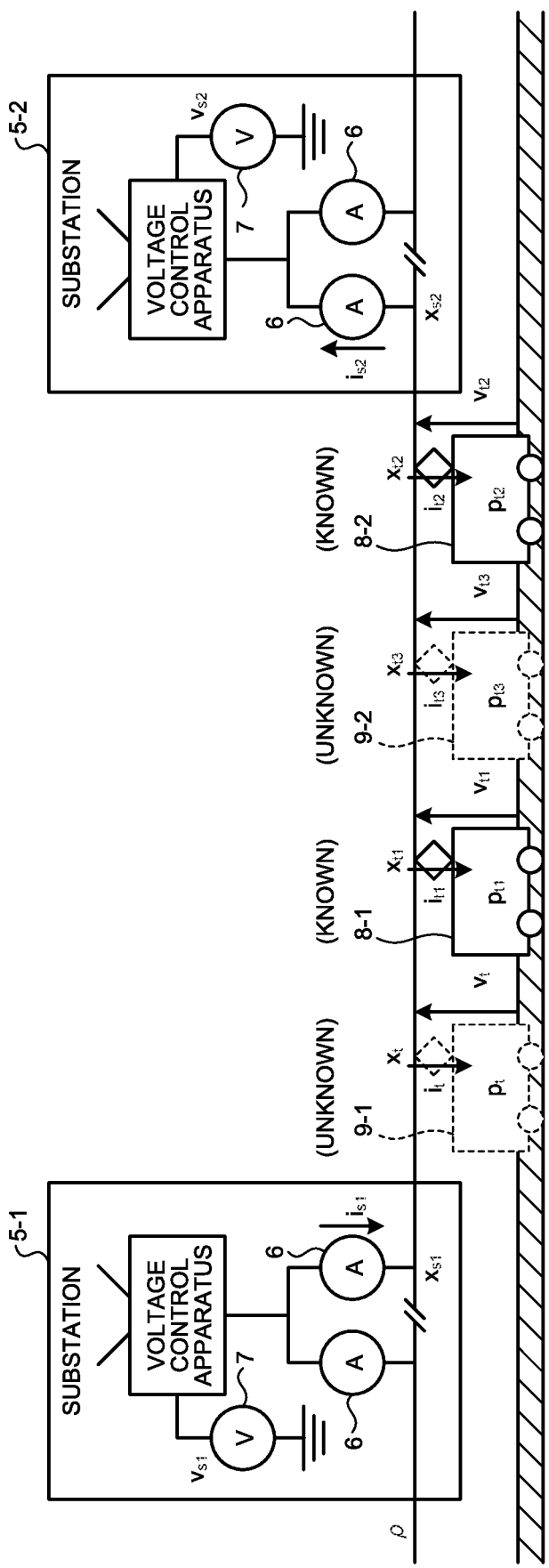
FIG. 17 is a diagram illustrating processing performed by a DC-feeding-voltage calculating apparatus according to a fifth embodiment for estimating an on-rail state of an unknown train between a substation and a known train and an on-rail state of an unknown train between known trains.

The configuration of the DC-feeding-voltage calculating apparatus 100 is the same as the configuration in the first embodiment. FIG. 17 is a diagram illustrating processing performed by the DC-feeding-voltage calculating apparatus 100 according to the fifth embodiment for estimating an on-rail state of an unknown train 9-1 between the substation 5-1 and the known train 8-1 and an on-rail state of an unknown train 9-2 between the known trains 8-1 and 8-2. The unknown trains 9-1 and 9-2 have the same configuration as the configuration of the unknown train 9 illustrated in FIG. 4 and the like. When any one of Expression (17) to Expression (19) in the first embodiment holds, the train-operation-information estimating unit 2 can estimate a section where the unknown train 9 exists and estimate a regeneratable voltage and the like concerning the unknown train 9. However, when the unknown train 9-2 exists between the substation 5-1 and the known train 8-1 and the unknown train 9-2 exists between the known train 8-1 and the known train 8-2, as illustrated in FIG. 17, the train-operation-information estimating unit 2 cannot estimate regeneratable voltages and the like concerning both of the unknown trains 9-1 and 9-2.

In such a case, the train-operation-information estimating unit 2 regards a subsection between the substation 5-1 and the known train 8-2 as one section; regards the unknown train 9-1, the known train 8-1, and the unknown train 9-2 as being equivalent to one unknown train 9; and estimates a regeneratable voltage and the like concerning the unknown train 9. That is, when the train-operation-information estimating unit 2 estimates that the unknown trains 9-1 and 9-2 exist in plural ones of separate subsections, the train-operation-information estimating unit 2 regards, as one section, these subsections including all the subsections where the unknown trains 9-1 and 9-2 are estimated to exist, and the train-operation-information estimating unit 2 estimates second train information in the subsections regarded as one section.

Figure 18:
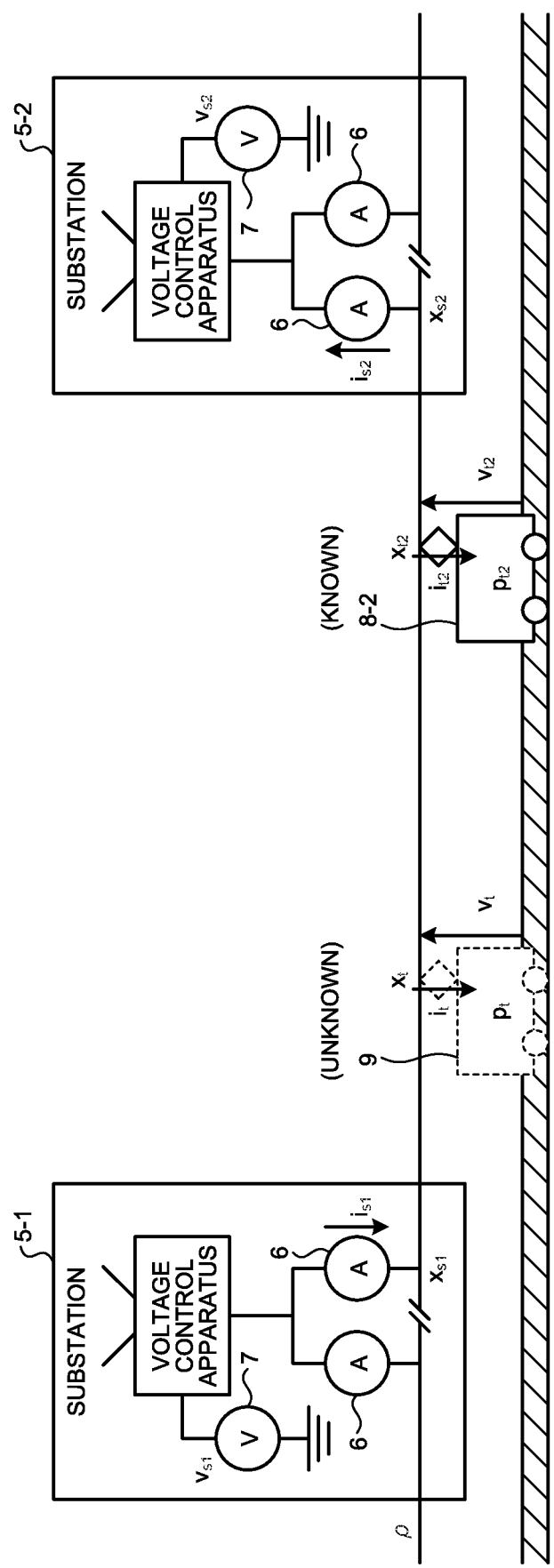
FIG. 18 is a diagram illustrating processing performed by the DC-feeding-voltage calculating apparatus according to the fifth embodiment for estimating an on-rail state of an unknown train with subsections between the substation and the known train being regarded as one section.

FIG. 18 is a diagram illustrating processing performed by the DC-feeding-voltage calculating apparatus 100 according to the fifth embodiment for estimating an on-rail state of the unknown train 9 with the subsections between the substation 5-1 and the known train 8-2 being regarded as one section. In a state illustrated in FIG. 18, the train-operation-information estimating unit 2 can estimate a regeneratable voltage and the like of the unknown train 9 from Expression (1) to Expression (8) in the first embodiment.

As explained above, when the DC-feeding-voltage calculating apparatus 100 according to this embodiment estimates that the unknown trains 9 exist in plural ones of subsections separated by the substations 5 and the known trains 8, the DC-feeding-voltage calculating apparatus 100 regards, as one section, subsections including all the subsections where the existence of the unknown trains 9 is estimated. The DC-feeding-voltage calculating apparatus 100 then regards, as one unknown train 9, unknown trains or unknown and known trains existing in the subsections regarded as the one section; and estimates an on-rail position, a regeneratable voltage, and the like. Consequently, the DC-feeding-voltage calculating apparatus 100 can estimate a train state even when the trains 9 not equipped with a wireless communication apparatus exist in a plurality of subsections. As a result, the DC-feeding-voltage calculating apparatus 100 can determine an optimum substation voltage and hence enable more effective utilization of regenerative power.

The configurations explained above in the embodiments indicate an example of the present invention. The configurations can be combined with other publicly-known technologies. A part of the configurations can be omitted or changed in a range not departing from the spirit of the present invention.

REFERENCE SIGNS LIST

1 model-information storing unit; 2, 2a, 2b train-operation-information estimating unit; 3, 3b substation-voltage-setting-value calculating unit; 4, 4b wireless communication unit; 5, 5-1, 5-2 substation; 6 current sensor; 7 voltage sensor; 8, 8-1, 8-2, 9, 9-1, 9-2 train; 10 model information; 20, 20b train operation information; 30 substation voltage setting value; 50 substation information; 80 train information; 81 wireless communication apparatus; 100, 100a, 100b DC-feeding-voltage calculating apparatus; 200, 200a, 200b DC-feeding-voltage control system; 300, 400 network

The invention claimed is:

1. A DC-feeding-voltage calculating apparatus connected to a plurality of substations that supply electric power to a feeder in a DC electrified section of an electric railroad, the DC-feeding-voltage calculating apparatus calculating a substation voltage applied to the feeder, the DC-feeding-voltage calculating apparatus comprising:

a model-information storage to store model information, the model information including train model information, feeding network model information, and substation model information, the train model information including information for controlling a regenerative power reducing amount in a train existing in the DC electrified section, the feeding network model information including position information on the substation, the substation model information including control information on the substation voltage;

a train-operation-information estimator to estimate second train information on the basis of the model information, first train information, a voltage value, and current values of feeders by train direction, the voltage value and the current values being measured in the substation, the first train information being information on a train equipped with a first wireless communication apparatus that performs wireless communication with the DC-feeding-voltage calculating apparatus, the second train information being information on a train existing in the DC electrified section and not equipped with a second wireless communication apparatus that performs wireless communication with the DC-feeding-voltage calculating apparatus, the train-operation-information estimator outputting train operation information including the first train information and the second train information; and a substation-voltage-setting-value calculator to calculate, on the basis of the model information and the train operation information, a substation voltage setting value for controlling the substation voltage such that regenerative power is increased in a regenerative car existing in the DC electrified section, the substation-voltage-setting-value calculator outputting the substation voltage setting value to the substations.

2. The DC-feeding-voltage calculating apparatus according to claim 1, wherein
the first train information includes information concerning an on-rail position of, a voltage value of a pantograph point voltage of, a current value of an electric current supplied from an overhead line to, power-running power of, regenerative power of, and regeneratable power of, a first train, the first train being equipped with the first wireless communication apparatus, the first train measuring the on-rail position, the voltage value of the pantograph point voltage, and the current value supplied from the overhead line, the power-running power, and the regenerative power and estimating the regeneratable power, and
the second train information includes information concerning an on-rail position of, power-running power of, regenerative power of, and regeneratable power of, a second train not equipped with the second wireless communication apparatus.

3. The DC-feeding-voltage calculating apparatus according to claim 1, wherein
the first train information includes information concerning an on-rail position of, a voltage value of a pantograph point voltage of, a current value of an electric current supplied from an overhead line to, power-running power of, and regenerative power of, a first train equipped with the first wireless communication apparatus, the first train measuring the on-rail position, the voltage value of the pantograph point voltage, the current value of the electric current supplied from the overhead line, the power-running power, and the regenerative power,
the second train information includes information concerning an on-rail position of, power-running power of, regenerative power of, and regeneratable power of, a second train not equipped with the second wireless communication apparatus, and
the train-operation-information estimator estimates, on the basis of the voltage value and the current value included in the first train information, regeneratable power of the first train, includes information concerning the estimated regeneratable power of the first train in the train operation information and outputs the information concerning the estimated regeneratable power.

4. The DC-feeding-voltage calculating apparatus according to claim 2, wherein the train-operation-information estimator
estimates presence or absence of the second train on the basis of voltage values measured in the substations and current values of feeders by train direction, position information on the substation, the on-rail position of the first train, the voltage value of the pantograph point voltage of the first train, and the current value of the electric current supplied from the overhead line to the first train, the current values of the feeders being measured in the substations, the on-rail position of the first train, the voltage value of the pantograph point voltage and the current value supplied from the overhead line being included in the first train information, includes information concerning the presence or absence of the second train in the train operation information, and outputs the information concerning the presence or absence of the second train.

5. The DC-feeding-voltage calculating apparatus according to claim 4, wherein, when the DC electrified section is divided into a plurality of subsections by positions of the substations and the on-rail position of the first train, the train-operation-information estimator estimates presence or absence of the second train in each of the subsections and estimates the second train information in a section where the second train is estimated to exist.

6. The DC-feeding-voltage calculating apparatus according to claim 5, wherein, when the train-operation-information estimator estimates that the second train exists in plural ones of the subsections, the train-operation-information estimator regards, as one section, subsections including all subsections where the second train is estimated to exist and estimates the second train information in the subsections regarded as one section.

7. A DC-feeding-voltage calculating apparatus connected to a plurality of substations that supply electric power to a feeder in a DC electrified section of an electric railroad, the DC-feeding-voltage calculating apparatus calculating a substation voltage applied to the feeder,
the DC-feeding-voltage calculating apparatus comprising:
a model-information storage to store model information, the model information including train model information, feeding network model information, and substation model information, the train mode information including information for controlling a regenerative power reducing amount in a train existing in the DC electrified section, the feeding network model information including position information on the substation, the substation model information including control information on the substation voltage;
a train-operation-information estimator to estimate second train information on the basis of the model information, first train information, a voltage value, and current values of feeders by train direction, the first train information being information on a train equipped with a first wireless communication apparatus that performs wireless communication with the DC-feeding-voltage calculating apparatus, the voltage value and the current values of the feeders being measured in the substation, the second train information being information on a train existing in the DC electrified section and not equipped with a second wireless communication apparatus that performs wireless communication with the DC-feeding-voltage calculating apparatus, the train-operation-information estimator outputting train operation information including the second train information; and
a substation-voltage-setting-value calculator to calculate, on the basis of the model information, the first train information and the train operation information, a substation voltage setting value for controlling the substation voltage such that regenerative power is increased in a regenerative car existing in the DC electrified section, the substation-voltage-setting-value calculator outputting the substation voltage setting value to the substations.

8. A DC-feeding-voltage calculating apparatus connected to a substation that supplies electric power to a feeder in a DC electrified section of an electric railroad and a voltage sensor that measures a voltage value of the feeder, the DC-feeding-voltage calculating apparatus calculating a substation voltage applied to the feeder, the DC-feeding-voltage calculating apparatus comprising:
a model-information storage to store model information, the model information including train model information, feeding network model information, and substation model information, the train model information including information for controlling a regenerative power reducing amount in a train existing in the DC electrified section, the feeding network model information including position information on the substation and the voltage sensor, the substation model information including control information on the substation voltage;
a train-operation-information estimator to estimate second train information on the basis of the model information, a voltage value measured in the substation, current values of feeders by train direction, the voltage value measured by the voltage sensor, and first train information on a train equipped with a first wireless communication apparatus that performs wireless communication with the DC-feeding-voltage calculating apparatus, the current values of the feeders being measured in the substation, the second train information is information on a train existing in the DC electrified section and not equipped with a second wireless communication apparatus that performs wireless communication with the DC-feeding-voltage calculating apparatus, the train-operation-information estimator outputting train operation information including the first train information and the second train information; and
a substation-voltage-setting-value calculator to calculate, on the basis of the model information and the train operation information, a substation voltage setting value for controlling the substation voltage such that regenerative power is increased in a regenerative car existing in the DC electrified section, the substation-voltage-setting-value calculator outputting the substation voltage setting value to the substation.

9. A DC-feeding-voltage control system that controls a substation voltage applied to a feeder in a DC electrified section of an electric railroad,
the DC-feeding-voltage control system comprising:
a voltage sensor and current sensors set on feeders by train direction;
a first wireless communication apparatus mounted on a train; and
a DC-feeding-voltage calculator, wherein on the basis of:
information concerning a voltage value measured in a substation and current values of the feeders by train direction, the current values of the feeders being measured in the substation; information concerning an on-rail position, a voltage value of a pantograph point voltage, a current value of an electric current supplied from an overhead line, the on-rail position, the voltage value of the pantograph point voltage and the current value of the electric current supplied from the overhead line being measured in the train; and model information including position information on the substation, the DC-feeding-voltage calculator calculates a substation voltage setting value for controlling the substation voltage such that regenerative power is increased in a regenerative car existing in the DC electrified section, the DC-feeding-voltage calculator outputting the substation voltage setting value to plural substations that supply electric power to the feeders, wherein the DC-feeding-voltage calculator includes a train-operation-information estimator to estimate second train information on the basis of the model information, first train information, the voltage value measured in the substation, and the current values of the feeders by train direction, the first train information being information on a train equipped with the first wireless communication apparatus that performs wireless communication with the DC-feeding-voltage calculator, the second train information being information on a train existing in the DC electrified section and not equipped with a second wireless communication apparatus that performs wireless communication with the DC-feeding-voltage calculator, the train-operation-information estimator outputting train operation information including the first train information and the second train information.

10. A DC-feeding-voltage calculating method applied to a calculating apparatus that calculates a substation voltage applied to a feeder line in a DC electrified section of an electric railroad,
the DC-feeding-voltage calculating method comprising:
acquiring: information concerning voltage values and current values of feeders by train direction, the voltage values and the current values being measured in a plurality of substations; first train information on a train equipped with a first wireless communication apparatus that performs wireless communication with the calculating apparatus; and model information including position information on the substations;
estimating, on the basis of the acquired information, second train information on a train existing in the DC electrified section and not equipped with a second wireless communication apparatus that performs wireless communication with the calculating apparatus;
calculating, on the basis of the model information, the first train information and the estimated second train information, a substation voltage setting value for controlling the substation voltage such that regenerative power is increased in a regenerative car existing in the DC electrified section; and
outputting, to the substations, the calculated substation voltage setting value.

11. The DC-feeding-voltage calculating apparatus according to claim 3, wherein the train-operation-information estimator
estimates presence or absence of the second train on the basis of voltage values measured in the substations and current values of feeders by train direction, position information on the substation, the on-rail position of the first train, the voltage value of the pantograph point voltage of the first train, and the current value of the electric current supplied from the overhead line to the first train, the current values of the feeders being measured in the substations, the on-rail position of the first train, the voltage value of the pantograph point voltage and the current value supplied from the overhead line being included in the first train information,
includes information concerning the presence or absence of the second train in the train operation information, and
outputs the information concerning the presence or absence of the second train.

12. The DC-feeding-voltage calculating apparatus according to claim 11, wherein, when the DC electrified section is divided into a plurality of subsections by positions of the substations and the on-rail position of the first train, the train-operation-information estimator estimates presence or absence of the second train in each of the subsections and estimates the second train information in a section where the second train is estimated to exist.

13. The DC-feeding-voltage calculating apparatus according to claim 12, wherein, when the train-operation-information estimator estimates that the second train exists in plural ones of the subsections, the train-operation-information estimator regards, as one section, subsections including all subsections where the second train is estimated to exist and estimates the second train information in the subsections regarded as one section.

\* \* \* \* \*